United States Patent
Vela et al.

(10) Patent No.: US 10,531,251 B2
(45) Date of Patent: Jan. 7, 2020

(54) DETECTING AND PROCESSING ANOMALOUS PARAMETER DATA POINTS BY A MOBILE WIRELESS DATA NETWORK FORECASTING SYSTEM

(71) Applicant: United States Cellular Corporation, Chicago, IL (US)

(72) Inventors: Mario Vela, Knoxville, TN (US); Michael Shannon Irizarry, Barrington Hills, IL (US); Narothum Saxena, Hoffman Estates, IL (US)

(73) Assignee: United States Cellular Corporation, Chicago, IL (US)

( * ) Notice: Subject to any disclaimer, the term of this patent is extended or adjusted under 35 U.S.C. 154(b) by 1797 days.

(21) Appl. No.: 13/656,856

(22) Filed: Oct. 22, 2012

(65) Prior Publication Data

US 2014/0111517 A1    Apr. 24, 2014

(51) Int. Cl.
*G06T 11/20* (2006.01)
*H04W 4/24* (2018.01)

(52) U.S. Cl.
CPC ..................... *H04W 4/24* (2013.01)

(58) Field of Classification Search
CPC .... G06T 11/206; G06F 3/0481; G06F 17/246; H04W 4/24
USPC ............... 345/440; 705/7.11, 7.31
See application file for complete search history.

(56) References Cited

U.S. PATENT DOCUMENTS

| | | |
|---|---|---|
| 5,659,593 A | 8/1997 | Tzvieli |
| 5,680,470 A | 10/1997 | Moussa et al. |
| 5,835,163 A | 11/1998 | Liou et al. |
| 5,983,251 A | 11/1999 | Martens et al. |
| 6,003,029 A | 12/1999 | Agrawal et al. |
| 6,055,491 A | 4/2000 | Biliris et al. |
| 6,223,544 B1 | 5/2001 | Seem |
| 6,278,446 B1 | 8/2001 | Liou et al. |
| 6,611,726 B1 | 8/2003 | Crosswhite |

(Continued)

OTHER PUBLICATIONS

Calyam, P."Modeling of multi-resolution active network measurement time-series", Local Computer Networks 33rd IEEE Conference [online], Oct. 2008, [retrieved on Sep. 25, 2014]. Retrieved from Internet: <URL:http://ieeexplore.ieee.org/xpls/abs_all.jsp?arnumber=4664300&tag=1><doi={10.1109/LCN.2008.4664300>.*

(Continued)

*Primary Examiner* — Barry Drennan
*Assistant Examiner* — Terrell M Robinson
(74) *Attorney, Agent, or Firm* — Leydig, Voit & Mayer, Ltd.

(57) ABSTRACT

A computer-automated method is described for identifying and remediating anomalous data points for acquired performance parameter (e.g., KPI) values for components of a mobile wireless data network—such as PDSNs. The remediated data point sets is thereafter used as input to a forecasting model rendering a forecast for a mobile wireless network performance indicator/parameter. Data point sequence seasonality is exploited to improve the detection of anomalous data points. Furthermore, correcting data point sets is reiterated until changes between two iterations of the correction process are within a threshold magnitude for terminating the iterative data point sequence correction process.

20 Claims, 16 Drawing Sheets

(56) References Cited

U.S. PATENT DOCUMENTS

| | | |
|---|---|---|
| 6,735,550 B1 | 5/2004 | Weekley et al. |
| 6,745,150 B1 | 6/2004 | Breiman |
| 6,853,920 B2 | 2/2005 | Hsiung et al. |
| 6,862,540 B1 | 3/2005 | Welch et al. |
| 6,917,845 B2 | 7/2005 | Hsiung et al. |
| 6,928,472 B1 | 8/2005 | Wen |
| 6,985,779 B2 | 1/2006 | Hsiung et al. |
| 6,993,377 B2 | 1/2006 | Flick et al. |
| 7,010,336 B2 | 3/2006 | Lorenz et al. |
| 7,020,643 B2 | 3/2006 | Mah et al. |
| 7,031,778 B2 | 4/2006 | Hsiung et al. |
| 7,124,055 B2 | 10/2006 | Breiman |
| 7,136,716 B2 | 11/2006 | Hsiung et al. |
| 7,183,057 B2 | 2/2007 | Benson |
| 7,272,530 B2 | 9/2007 | Hsiung et al. |
| 7,277,843 B1 | 10/2007 | Wen et al. |
| 7,299,154 B1 | 11/2007 | He et al. |
| 7,308,364 B2 | 12/2007 | Shaughnessy et al. |
| 7,313,447 B2 | 12/2007 | Hsiung et al. |
| 7,333,923 B1 | 2/2008 | Yamanishi et al. |
| 7,337,206 B1 | 2/2008 | Wen et al. |
| 7,346,471 B2 | 3/2008 | Chickering et al. |
| 7,346,593 B2 | 3/2008 | Takeuchi et al. |
| 7,346,803 B2 | 3/2008 | Ide et al. |
| 7,392,201 B1 | 6/2008 | Binns et al. |
| 7,423,930 B2 | 9/2008 | Valero et al. |
| 7,424,489 B1 | 9/2008 | Duffield et al. |
| 7,480,640 B1 | 1/2009 | Elad et al. |
| 7,502,713 B2 | 3/2009 | Hillier et al. |
| 7,509,229 B1 | 3/2009 | Wen |
| 7,519,406 B2 | 4/2009 | Blank et al. |
| 7,539,627 B2 | 5/2009 | Schmidt |
| 7,565,335 B2 | 7/2009 | Tang et al. |
| 7,590,513 B2 | 9/2009 | Jiang et al. |
| 7,610,214 B1 | 10/2009 | Dwarakanath et al. |
| 7,627,454 B2 | 12/2009 | LaComb et al. |
| 7,636,051 B2 | 12/2009 | Imai et al. |
| 7,647,524 B2 | 1/2010 | Ide et al. |
| 7,657,494 B2 | 2/2010 | Wilkinson et al. |
| 7,668,579 B2 | 2/2010 | Lynn |
| 7,668,769 B2 | 2/2010 | Baker et al. |
| 7,675,813 B2 | 3/2010 | Valero et al. |
| 7,706,965 B2 | 4/2010 | Downs et al. |
| 7,707,062 B2 | 4/2010 | Abramowicz |
| 7,715,961 B1 | 5/2010 | Kargupta |
| 7,716,022 B1 | 5/2010 | Park et al. |
| 7,734,420 B2 | 6/2010 | Palsson et al. |
| 7,734,451 B2 | 6/2010 | MacArthur et al. |
| 7,737,889 B1 | 6/2010 | Goad |
| 7,739,143 B1 | 6/2010 | Dwarakanath et al. |
| 7,756,676 B1 | 7/2010 | Shan |
| 7,758,503 B2 | 7/2010 | Lynn et al. |
| 7,783,510 B1 | 8/2010 | Gilgur et al. |
| 7,822,604 B2 | 10/2010 | Amini et al. |
| 7,830,382 B2 | 11/2010 | Cirit et al. |
| 7,831,380 B2 | 11/2010 | Chapman et al. |
| 7,836,111 B1* | 11/2010 | Shan ........................... 708/200 |
| 7,857,760 B2 | 12/2010 | Brister et al. |
| 7,865,389 B2 | 1/2011 | Shan |
| 7,899,699 B1 | 3/2011 | Kumar |
| 7,905,833 B2 | 3/2011 | Brister et al. |
| 7,908,076 B2 | 3/2011 | Downs et al. |
| 7,912,561 B2 | 3/2011 | Hsiung et al. |
| 7,912,627 B2 | 3/2011 | Downs et al. |
| 7,912,628 B2 | 3/2011 | Chapman et al. |
| 7,917,338 B2 | 3/2011 | Basak et al. |
| 7,921,029 B2 | 4/2011 | Boardman et al. |
| 7,946,474 B1 | 5/2011 | Agrawal |
| 7,962,291 B2 | 6/2011 | Williams et al. |
| 7,969,174 B2 | 6/2011 | Balog et al. |
| 7,987,106 B1 | 7/2011 | Aykin |
| 7,989,165 B2 | 8/2011 | Benson |
| 8,005,524 B2 | 8/2011 | Brauker et al. |
| 8,005,707 B1 | 8/2011 | Jackson et al. |
| 8,010,394 B2 | 8/2011 | Wan |
| 8,014,936 B2 | 9/2011 | Chapman et al. |
| 8,015,133 B1 | 9/2011 | Wu et al. |
| 8,090,524 B2 | 1/2012 | Chapman et al. |
| 8,103,539 B2 | 1/2012 | Boardman et al. |
| 8,117,486 B2 | 2/2012 | Handley |
| 8,140,381 B1 | 3/2012 | Wu et al. |
| 2006/0122921 A1* | 6/2006 | Comerford et al. ............ 705/35 |
| 2007/0030287 A1* | 2/2007 | Buran ........................... 345/629 |
| 2008/0148180 A1* | 6/2008 | Liu et al. ...................... 715/800 |
| 2010/0015926 A1* | 1/2010 | Luff .................... H04L 41/0604 455/67.13 |
| 2010/0165812 A1* | 7/2010 | Howard et al. ............ 369/53.21 |
| 2010/0203881 A1* | 8/2010 | del Rio Romero et al. ................. 455/423 |
| 2010/0214110 A1* | 8/2010 | Wang et al. .................. 340/665 |
| 2010/0228854 A1* | 9/2010 | Morrison et al. ............. 709/224 |
| 2011/0026506 A1* | 2/2011 | Macnaughtan ........ G01S 5/0236 370/338 |
| 2011/0149782 A1* | 6/2011 | Townley et al. .............. 370/252 |
| 2011/0153295 A1* | 6/2011 | Yerramalla et al. ............. 703/7 |
| 2013/0166730 A1* | 6/2013 | Wilkinson ............ H04L 41/142 709/224 |

OTHER PUBLICATIONS

"Comparing Data Scatter Graphs and Line of Best Fit", 2012, XtremePapers, [retrieved on Sep. 25, 2014]. Retrieved from Internet:<URL:https://www.xtremepapers.com/revision/gcse/statistics/comparing_data_scatter_graphs_and_lineof_bestfit.php>.*

* cited by examiner

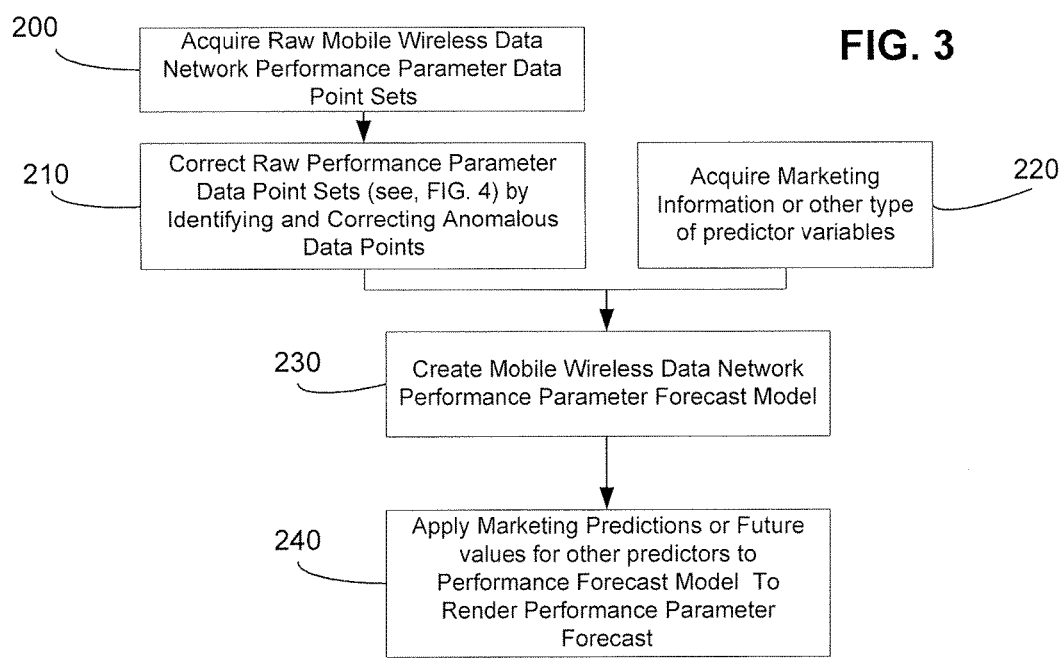

DETECTING AND PROCESSING ANOMALOUS PARAMETER DATA POINTS BY A MOBILE WIRELESS DATA NETWORK FORECASTING SYSTEM

FIELD OF THE INVENTION

This invention relates generally to the field of mobile wireless communications networks. More particularly, the invention is directed to supporting mobile wireless data communication services (such as those supporting data flows to/from smart phones) in such networks, and more specifically to maintaining infrastructure components supporting data communications in mobile wireless networks.

BACKGROUND OF THE INVENTION

Changes in usage patterns by customers of mobile wireless communications services, with an increased emphasis on smart phone-based data traffic as opposed to voice, have placed unprecedented demand upon underlying physical network infrastructures that support such services. Proliferation of smart phones, and their subsequent use to carry out high volume/data-rate communications—including streaming video transmissions—has resulted in exponential growth in the volume of data flowing over wireless networks. The substantial increased data transmission volume via existing physical networks is challenging the capabilities of the infrastructure to a degree that was not contemplated when mobile wireless services were primarily used to support voice communications. The increased volume of data communications presents a challenge for service providers who must ensure reliable mobile wireless service for most, if not all, users.

Moreover, users have become accustomed to receiving mobile wireless service at unprecedented levels of quality and reliability. The high degree of reliability achieved by mobile wireless services has resulted in many mobile wireless subscribers foregoing conventional landline service. Such subscribers rely wholly upon mobile wireless service to meet their communication needs, or at least to meet their voice communications needs. Given the increased reliance of subscribers, it is imperative for the underlying mobile wireless network infrastructure to be properly maintained. When parts of the mobile wireless network infrastructure are unable to adequately support subscriber needs at particular locations in the network, such parts (e.g., cell sites or portions thereof) must be identified. Thereafter, the cause(s) of the identified performance failure need to be identified, and solutions are proposed.

The ability to accurately forecast, with a satisfactory level of precision, data throughput demand at various physical points within a mobile wireless network at particular points in time ensures that proper resources are committed by a mobile network service provider to meet user needs. Key Performance Indicators (KPIs) are a type of information used to measure the performance and capacity of wireless networks. Actual data throughput demand, and the mobile wireless network's ability to meet the data throughput demand are important Key Performance Indicator (KPI) types. Examples of other KPI types include: data sessions, transactions per unit time (e.g., second), disk usage, CPU usage, memory usage, data attempts, data sessions, data volume, and messages per unit time. Vast quantities of KPI data points are acquired for processing/analyzing during the course of a period of review for purposes of analyzing user data throughput demand on various mobile wireless network components and the mobile wireless network components' ability to meet such demand.

Network service providers do not have unlimited access to resources for addressing every need evidenced by acquired KPI's. A challenge to maintaining a mobile wireless data network, based upon monitored performance and capacity measurements, is to ensure proper allocation of limited resources for repairing and/or upgrading existing network infrastructure components. However, identifying the cause of poor data transmission service and the remedy for the poor service is not a trivial endeavor. Several challenges to identifying anomalous data points are discussed below.

A first challenge, to conducting a meaningful analysis and proposing a beneficial long term response to identified problems/needs in a mobile wireless data network, is the massive volume of raw network performance (e.g., KPI) data acquired by various components of the mobile wireless network. During the course of an evaluation period, a mobile wireless data network management system acquires millions of potentially useful data points for processing. It would take years for such information to be evaluated manually. Therefore, some form of automated evaluation process is essential.

Another challenge involves determining the relevance of individual data points acquired during a period of interest. The raw data itself merely provides a set of performance "facts." The information itself is incapable of specifying whether a particular mobile wireless data network component is performing satisfactorily and/or whether remedial actions are needed. Thus, standards are generally formulated and applied to the acquired performance data.

Yet another challenge involves identification of performance data trends. Over time, the volume of data at any given node or portion of a mobile wireless network can, and likely does, change. Thus, when a data standard/threshold for forecasting mobile wireless data network system needs is established, that data standard may need to be adjusted over time to address the dynamic nature of user demand as well as any other time-dependent change to observed performance parameters of a mobile wireless data network. Building in a time variant aspect to forecasted performance parameters ensures longevity of the models used by computerized/automated mobile wireless data network performance forecasting systems.

SUMMARY OF THE INVENTION

Embodiments of the invention are used to provide a method, non-transitory computer readable medium, and a forecasting computer system configuration facilitating and performing operations for computer-automated identification and remediation of anomalous data points for acquired performance parameter (e.g., KPI) values for a mobile wireless data network, the remediated data point sets being used as input to a forecasting model rendering a forecast for a performance indicator/parameter relating to the mobile wireless data network.

More particularly, examples are described herein of a method (also computer-readable medium and configured computer system) for rendering, by a computerized mobile wireless data network performance parameter forecasting system, a forecast for a mobile wireless network performance parameter. The method includes acquiring, via a communications network infrastructure for the mobile wireless network, a raw data point set containing a series of data point values for the mobile wireless network parameter. The method further includes correcting the raw data point set.

The correcting of the raw data point set includes a number of subsets. The correcting includes performing a first linear regression on the raw data point set to render an initial best fit line. This step is followed by calculating a current series of data point residuals based upon: a current best fit line, the current best fit line being in a first instance the initial best fit line, and a current series of data point values, the current series of data point values being in a first instance the raw data point set. The correcting step further comprises the sub-steps of decomposing the current series of data point residuals into a current set of seasonal data point residual subsets, and performing a boxplot analysis on the current set of seasonal data point residual subsets to identify a current set of anomalous data point residuals. The correcting further comprises correcting the current set of anomalous data point residuals to render a corrected data point residual set, and applying the corrected data point residual set to the current best fit line to render a current corrected data point set.

The computer-implemented method continues by performing the step of applying the current corrected data point set, rendered by the correcting step, to a forecast model to render a forecast for the mobile wireless network performance parameter.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 2 is an exemplary set of data types acquired, stored, processed and analyzed for a particular time period and mobile wireless data network element in exemplary systems;

FIG. 3 is a flowchart summarizing a set of steps for carrying out a method of generating a forecast for evaluating mobile wireless data network performance based upon acquired performance (e.g., KPI) parameter value sets and predictor variables;

DETAILED DESCRIPTION OF THE DRAWINGS

Exemplary embodiments of the invention described herein acquire and process a combination of mobile wireless data network performance parameter data point sets to render performance forecasts based upon corrected versions of acquired data point sets and possibly other sources of forecast information, such as information acquired through marketing surveys of users.

The forecasting system described herein identifies and corrects (e.g., modifies or otherwise removes) unusual (anomalous) data points in highly seasonal performance parameter data point sets. Such identification and correction is carried out in an automated manner to render a corrected data set that is ready for application to a forecast model in a next stage of the forecasting system. The approach described herein accounts for, and in fact exploits, seasonal variations in observed values for mobile wireless data network performance parameters. Detection algorithms for identifying anomalous data are also suitable under other circumstances and might benefit other areas of mobile wireless data network service providers in need of an automated process that detects and corrects statistically unusual data points in performance parameter data point sets exhibiting an observable degree of seasonality. The forecasting system is, by way of example, deployed using a combination of database/client machines running statistical programming languages such as, for example, R (open source programming language) and BUSINESS INTELLIGENCE software like IBM COGNOS or Jaspersoft's JASPERSERVER.

The correcting and subsequent use of parameter value data point sets is applied specifically to wireless network data and relies upon strong seasonality observed in mobile wireless data networks. Such seasonality facilitates use, by the forecasting system, of statistical methods, like boxplot and linear regression, to identify large variations within seasonal periods. Furthermore, using boxplot analysis on residual data (i.e., the error term from a regression analysis), rather than the actual raw data, renders a robust methodology under trending conditions for an observed performance parameter—by isolating effects of trends from data point set correcting operations.

Figure 1:
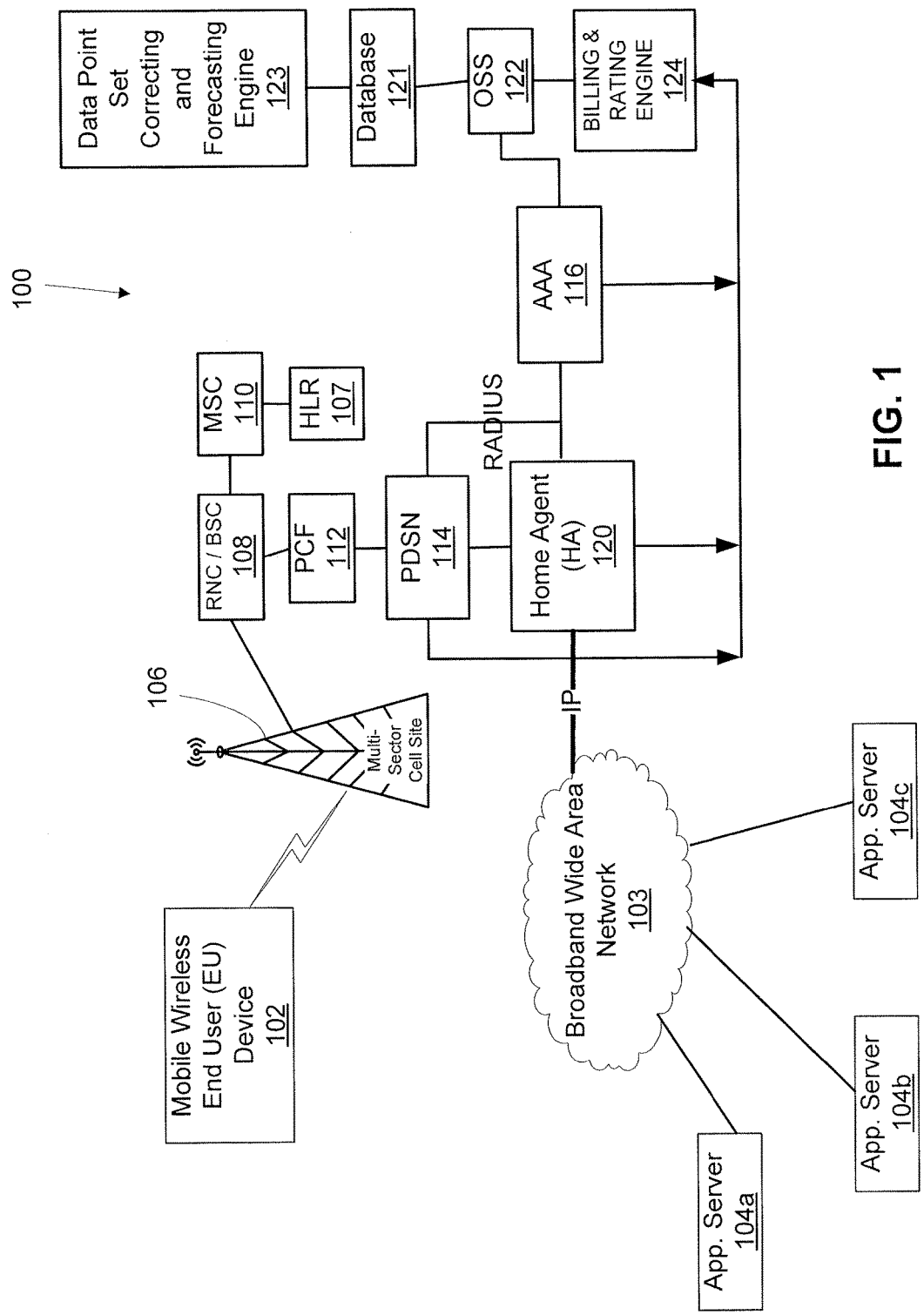
FIG. 1 is a schematic diagram illustrating a mobile wireless data network environment interfaced to a broadband digital data network providing access to a variety of application servers.

Turning to FIG. 1, an exemplary network environment is schematically depicted that includes monitoring and management components facilitating acquiring and processing a variety of performance data in accordance with the aforementioned mobile wireless data network performance parameter detection and forecasting functionality. The illustrative embodiment includes a mobile wireless network system 100 that incorporates, by way of example, CDMA2000 based mobile wireless network components (e.g., AAA service for performing user authentication and providing user profiles) and includes data services delivered via one or more data access protocols, such as EV-DO, EV-DV or the like. Other embodiments include a wireless access network complying with one or more of LTE, WCDMA, UMTS, GSM, GPRS, EDGE, Wi-Fi (i.e., IEEE 802.11x), Wi-MAX (i.e., IEEE 802.16), or similar telecommunication standards configured to deliver voice and data services to mobile wireless end user devices such as, a mobile wireless device 102 depicted in FIG. 1 carrying out wireless communications via a base station 106 (also referred to as a base transceiver station or cell site). While only a single base station 106 is depicted in FIG. 1, the mobile wireless network system 100 includes hundreds of such stations per RNC/BSC 108 and, therefore, thousands of such stations per operator network. The scaling of base stations within the network continues to grow as smaller base station solutions continue to emerge through wireless innovation. (i.e., picocells, femtocells, hotspot solutions, etc). Each of the base stations is capable of acquiring thousands, even millions, of data points during a period of observation used to develop a forecast model and/or render a forecast for usage and performance of mobile wireless data network components.

The mobile wireless network system 100 provides mobile wireless data network services via the base station 106 to the mobile device 102. The mobile device 102 is any of a variety of devices including, for example: a mobile phone, a PDA, or a mobile computer (e.g., a laptop, notebook, notepad, tablet, etc.) having mobile wireless data communication capability.

The mobile wireless system 100 includes a plurality of base stations, such the base station 106. The base station 106, by way of example, includes radio bearer resources and other transmission equipment necessary for wireless communication of information between the mobile device 102 and other network elements. The base station 106 includes one or more transceiver-antenna combinations. In the case of sectorized base stations, two or more transceiver-antenna combinations are provided to cover particular parts of an area (actually a volume of space, discrete coding scheme, or sinusoidal phase offset) covered by the base station 106. A typical arrangement for a cellular communications base station is a tri-sector arrangement where three static areas are arranged in carefully engineered "n" degrees of rotational displacement from one another. Base stations, such as base station 106, come in a variety of forms, and there is no intention to limit the scope of the invention to any particular arrangement. More generally, there is no intention to limit the invention to the exemplary environment schematically depicted in FIG. 1 since the described management system and scheme for detecting problematic cell sites (base stations) and the specific problematic sectors within the cell sites, applies to other types of wireless communications systems including, without limitation, 3GPP2, EVD0 and LTE based mobile wireless network systems.

The mobile wireless network system 100 is, in turn, connected to a broadband wide area network 103. The broadband network 103 provides digital data connectivity to a variety of application servers 104a, 104b, and 104c. The application servers 104a, 104b, and 104c are representative of millions of application server systems (both in-service operator network servers and out-of-operator network servers) providing a variety of Web-based services via the Internet.

Turning attention to particular components of the mobile wireless system 100, where logical connections are identified by connection lines (not necessarily representing the physical links through which identified components communicate), a home location register (HLR) 107 provides services for authenticating an identity of the mobile device 102 prior to permitting access to radio access network resources of the mobile wireless system 100. The HLR 107, by way of example, maintains a database of subscribers to the mobile wireless system 100. Each individual subscriber (e.g., each distinctly identified mobile device) entry includes a Mobile Identification Number (MIN) and/or Electronic Serial Number (ESN).

Moreover, for each data access network, radio access network resources are used to control the radio interface aspect of the mobile wireless system 100 that includes the plurality of base stations. Control of the radio interface of the base station 106 within the system 100 is carried out, for example, by a radio network controller (RNC) or a base station controller (BSC), identified in FIG. 1 as RNC/BSC 108. The RNC/BSC 108 manages the radio traffic between neighboring ones of a plurality of base stations such as the base station 106. Such management of radio traffic includes controlling handoff between sectors and/or base stations.

Additionally, the mobile wireless system 100 illustratively depicted in FIG. 1 includes a mobile switching center (MSC) 110. The MSC 110 manages voice calls placed in and out of the mobile wireless system 100.

Continuing with the illustrative schematic depiction of the wireless network 100, a packet control function (PCF) 112 is communicatively coupled to the RNC/BSC 108. The PCF 112 carries out the function of routing data packets from the RNC/BSC 108 to one of a set of PDSNs. The RNC/BSC 108 is, by way of example, collocated with a packet control function (PCF) 112. It is noted that in the illustrative example, the system 100 is depicted as having a single packet data serving node (PDSN)—i.e., PDSN 114, and in such instance the PCF 112 is not needed to perform the aforementioned routing to a particular one of multiple PDSNs. However, in cases where a wireless system comprises multiple PDSNs, the PCF 112 selectively routes data packets received from the RNC/BSC 108 to an appropriate one of the set of PDSNs for further processing.

The illustrative mobile wireless system 100 includes one or more services (implemented in the form of computer executable instructions carried out by processors on one or more physical server machines) that authenticate and determine/designate access rights for particular identified entities prior to granting access to the mobile wireless system 100's data network transmission services. In the exemplary embodiment, such authentication services are provided by an accounting authentication authorization (AAA) service 116.

The AAA service 116 carries out the task, during set up of a session for an identified subscriber, of ensuring that the subscriber associated with the mobile device 102 is allowed to use the data resources of the system 100. After initially confirming the authenticity of the identified user seeking to establish a user session, the AAA service 116 provides a response including a profile for the identified user including, among other things, user permissions. The permissions can be implicit—e.g., the user is identified as belonging to a particular group—or explicitly listed in the profile assigned to the system.

Upon completion of the user authorization process for the use of data resources, via the PDSN 114 and AAA service 116, a home agent (HA) 120 forwards an IP address, received from the AAA server 116, to the PDSN 114. The PDSN 114, in turn, forwards the IP address to the mobile device 102. In the illustrative example, the HA 120 is a router located on a home network of the mobile device 102. The HA 120 tunnels packets from the home network to the mobile device 102 when the mobile device 102 is roaming.

An Operating Support System (OSS) 122 serves as a central point for administration, management, and provisioning of all network elements. Among other things, the OSS 122 administers the individual accounts of subscribers that use the mobile wireless system 100—including specifying the profile values that determine permissions for users associated with the account with which the mobile device 102 is associated. In accordance with an illustrative embodiment, the OSS 122 collects raw performance (e.g., KPI) parameter data point sets from any of a variety of mobile wireless data network components, including base stations, gateways, etc. With reference to FIG. 1, such information is received, for example, from PDSN 114, AAA 116, HA 120, RNC 108 and PCF 112. To ensure availability of the OSS 122 resources for other management functions, the OSS 122 stores the received parameter data point sets in a data point set database repository 121. While the information stored in the database 121 is stored via the OSS 122 in the illustrative example, it is expressly noted that in alternative embodiments, such information is acquired/stored via alternative network entities. Also, the manner in which such information is acquired varies in accordance with various embodiments including, for example, simple network management protocol (SNMP) polling by a networked server separate from the OSS 122. Such arrangement is particular valuable in physical network arrangements comprising multiple OSS nodes handling network equipment provided by different vendors. In that case, the database repository 121 operates as a central storage location for all acquired/processed network performance parameter data used to build network performance/usage forecasts.

An application server 123, configured to incorporate both data point set correcting and forecasting functionality, retrieves the stored raw data point sets from the database repository 121. The application server 123 includes data point set correcting processing components (see, FIGS. 3 and 4 described herein below) for detecting/correcting anomalous data points within the raw performance parameter data point sets stored in the database repository 121. Forecasting engine functional components on the application server 123 thereafter process the corrected performance parameter data point sets. In particular a model (e.g., Linear/Multiple Regression, ARIMA, ARIMAX, etc.) is applied to the corrected data set to generate a forecast for a particular performance parameter corresponding to the processed data point set. It is noted that the forecasting system described herein can utilize any of a variety of known commercial forecasting engines to process the corrected data points.

Furthermore, in accordance with an exemplary embodiment, the mobile wireless system 100 further includes a billing and rating engine 124. As indicated in FIG. 1, the billing and rating engine 124 is a back office system that is configured to receive certain information, based upon subscriber usage information received from other components of the system 100. The billing and rating engine 124 communicates such information to the OSS 122. By way of example, the billing and rating engine 124 monitors information provided by the HA 120 indicating a particular mode within which the mobile device 102 is (or has been) operating—as well as the quantity of data passed by the mobile device 102 while operating in the indicated mode. The billing and rating engine 124 issues a notification to the OSS 122 that the mobile device 102 is (or has been) operating in a particular mode. The indicated particular operational mode of operation sent to the OSS 122, if not permitted under the current user profile for the mobile device 102, initiates immediate and/or delayed responsive actions by the mobile wireless system 100 to ensure that the mobile device 102 operates in accordance with the terms of a current user agreement.

As those of ordinary skill in the art will realize, the foregoing network elements of the mobile wireless system 100 are implemented via telecommunications equipment having one or more computer processors, as well as non-transitory computer readable media, such as RAM/ROM, solid-state memory, and/or hard drive memory and the like, which store computer executable instructions for executing embodiments of the methods described in further detail below.

Turning to FIG. 2, an exemplary set of performance data information types are provided that support the operation of the forecasting system described herein. Such forecasting system is carried out on the database 121 and the application server 123 comprising programmed processing hardware for statistically correcting data used to provide forecasts for the mobile wireless data network depicted, by way of example, in FIG. 1. By way of example, data points corresponding to the information types summarized in FIG. 2 are received from mobile devices and/or base stations and forwarded through the RNC 108 (eventually) to the OSS 122. An exemplary data format for received data points include a timestamp (time period, such as a date and hour within which the data was acquired) and network element ID (identifying a source of the data), a data type identifier, and a data point value.

The forecasting system described herein is intended to utilize a variety of data having different seasonalities. Various time spans are potentially associated with the various types of data identified in FIG. 2. Such time spans include a minute, an hour, a day, etc. Also, the database entry for the time period can represent averaged data over the period of a day (e.g., average of 60 values accumulated once per minute over an hour). Thus, the time period represents various measures within various time spans in accordance with alternative embodiments. Moreover, such data can be provided a single data point at a time or, alternatively, bundled into a composite data message that is received and unpacked by, for example, the OSS 122 before storing the individual data points within the database 121.

The application server 123, whose operation is summarized in FIGS. 3 and 4, and the associated written description herein below, operates upon the acquired raw data to render forecasts for a variety of system parameters based upon performance parameter data sets that have corrected statistically anomalous data points—thus rendering a more accurate prediction of future system operation. The statistically anomalous data points are identified by the application server in accordance with the exemplary set of steps summarized in FIG. 4.

With particular reference to FIG. 2, a set of exemplary performance parameters are identified for a mobile wireless network component (e.g., the PDSN 114). For each listed performance parameter, the value acquired and stored in the database 121 represents a measured quantity for a specified time span and mobile wireless data network component. The performance parameters are potentially used to measure a degree to which particular mobile wireless data network components are reaching capacity limits. A data throughput parameter 150 is a measure of a quantity of data (e.g. bits or bytes) passing through and/or processed by a mobile wireless network component during a specified time span (e.g., Mbps). A data sessions parameter 152 is a quantity of distinct sessions initiated during a time span. A data attempts parameter 154 is a quantity of distinct requests for data by mobile devices. A data volume parameter 156 is a quantity of data passing through a particular network node. A transactions parameter 158 is a quantity of unique request/response pairs processed by a network node. A messages parameter 160 is a quantity of messages passing through or handled by a network node. A CPU usage parameter 162, for a particular network component, represents the percentage (e.g., maximum or average) of non-idle process CPU cycles over a time period—a potential indicator of whether additional, or more powerful, processors are needed for the component. A memory usage parameter 164 represents the quantity or percentage of memory used over a time period (e.g., maximum or average usage)—potential indicator of whether additional memory needs to be added to the component. A disk usage parameter 166 represents the amount (quantity or percentage) of disk memory used over a time period (e.g., maximum or average).

Yet other performance data information types are contemplated for facilitating network usage forecasting relating to maintaining sufficient capacity in the face of changing network usage trends. As such, the performance data information types identified in FIG. 2 are intended to be exemplary.

Turning to FIG. 3, a flowchart provides a summary of a set of operations performed by a forecasting system for rendering a computer-generated forecast in accordance with a provided model and a corrected set of performance parameter data points, such as those identified in FIG. 2 discussed herein above, relating to operation of a mobile wireless data network such as the one illustratively depicted in FIG. 1.

During step 200, the forecasting system acquires a set of raw mobile wireless data network performance parameter data points. By way of example, during step 200 a set performance parameter data points, of any one or more of the performance data types listed in FIG. 2, are acquired for a geographical area of interest. An exemplary area of interest is, for example, obtained by identifying a set of cell sites within a particular market (e.g., a designated urban area and its surrounding suburbs). In other examples, particular specialized nodes making up a core network, to which the cell sites connect, provide particularized information of the type enumerated in FIG. 2.

Thereafter, during step 210, the raw performance parameter data point set (or sets) are corrected by the forecasting system by identifying anomalous data points from the data point set (or sets) acquired during step 200. The identified anomalous data points are corrected to render a corrected set of mobile wireless data network performance parameter data points. Moreover, an updated linear trend is calculated from the corrected set of data points. The correcting step 220 is described, by way of a detailed example, herein below with reference to FIG. 4.

During step 220, that occurs independently of steps 200 and 210 (and thus shown as a separate process flow), the forecasting system receives a variety of marketing information and/or other types of manually acquired predictor variable data. Examples of such information include: subscriber numbers (broken down by subscription type), percentage of data allocation consumed (in data limited plans), and current/future sales of particular mobile devices and associated data transmission protocol technology.

During step 230 a mobile wireless data network performance parameter forecast model is created. Such model, as will be explained further herein below, comprises a combination of weighted performance parameter values provided via steps 200, 210 and 220 described herein above. In general, the forecast models identify trends based upon recent historical information for any mobile wireless network component or group of components to ensure sufficient future mobile wireless data network capacity in the face of rising consumer demand for mobile wireless data services capacity.

The forecasting process, by way of example, includes building a model relating a KPI of interest. In a mathematical expression of the forecast model, the KPI is a dependant variable with one or multiple independent variables or predictors. One way of carrying out the model building step 230 employs statistical analysis (e.g., multiple regression). However, because time series data in wireless networks usually presents important lagged components that violate a regression assumption of independence it may be better to consider forecast models that contemplate the time interactions such as Transfer Function Models and Autoregressive Moving Average (ARMA) Models. Such models accommodate lagged components of the dependant variable. Such models also support including external predictors and their lagged components from other sources (e.g., marketing, sales data provided during step 220) as well as seasonal components that potentially aid a fitting process. An example of a Transfer Function Model for a KPI (Y) is provided in equation 1.

$$Y(t) = \frac{\omega(B)}{\delta(B)} X(t) + \frac{\theta(B)}{\Phi(B)} a(t) \quad \text{(equation 1)}$$

Where $\omega(B)$, $\delta(B)$, $\theta(B)$, $\Phi(B)$ are polynomials on B (the backshift operator as defined by $B^k * X_t = X_{t-k}$) which reflect the time lag/lead component of the system, X(t) is a time series variable predictor and a(t) is zero mean white noise process vector. It is explicitly noted that the forecast model operates on data vectors comprising time-series sequences of data points—as opposed to single data values. Thus, the model renders a forecast vector parameter value based upon input data point vectors comprising a time-series sequential set of data points.

In the example of a forecast model for a KPI (Y) containing lagged components provided herein above, the dependent variable Y is a function of a predictor X having a time structure defined by the ratio $\omega(B)/\delta(B)$ (i.e. an ARMA structure) and a white noise process with an ARMA structure defined by $\theta(B)/\Phi(B)$.

During step 240 the forecasting system applies the forecast model provided during step 230 to the corrected set of mobile wireless data network performance parameter data points rendered during step 210 and the additional predictor variable data during step 220. Upon completing step 240 a forecast, based upon at least one corrected performance parameter data point set and its resulting trend, is rendered by the forecast system.

Figure 4:
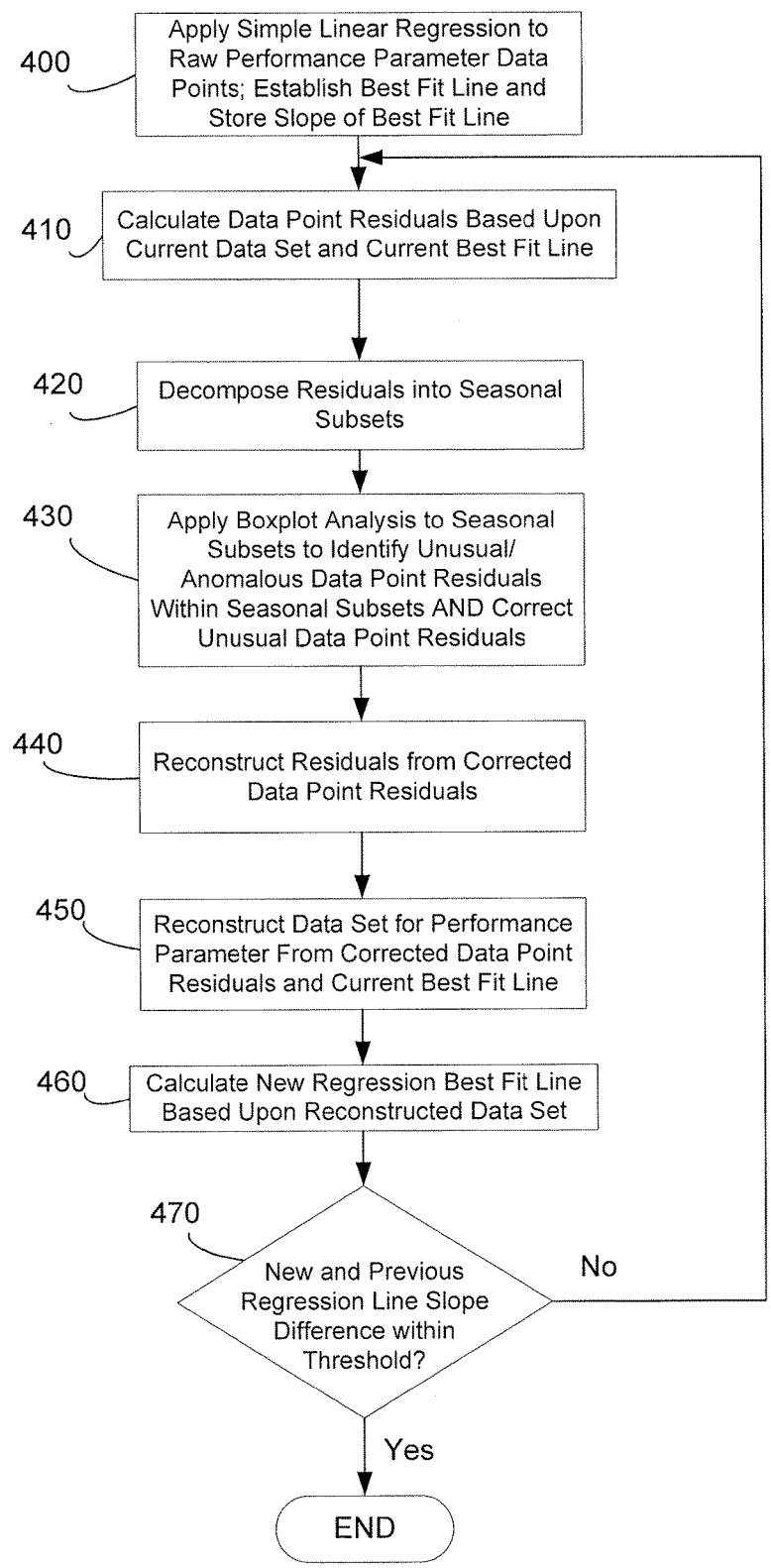
FIG. 4 is a flowchart summarizing an exemplary set of steps performed in accordance with the step of identifying/correcting anomalous data from the raw performance data set of FIG. 3.

Turning to FIG. 4, a set of steps are summarized for carrying out the correcting operation on the raw performance parameter data point set during step 220 of the computer-implemented process summarized in FIG. 3. As noted previously above, the raw data point set exhibits, to an observable degree, seasonality. Thus, prior to performing the correcting operation the seasonality of the raw data point set is established. The seasonality relates to a period of time over which trending data exhibits a repeating shape (e.g., a sinusoid, a saw tooth, etc.) as well as a particular set of sub-periods (seasons) for which values tend to repeat from period to period—subject to a long term trend exhibited over a series of repetition periods of the seasons. Thus, establishing a seasonality definition for a particular performance variable involves dual determinations of: (1) the repetition period for a sequence of seasons, and (2) the time span (and thus number) of individual seasons within the repetition period. By way of example, the smallest time span is chosen where seasonality is reliably exhibited from repetition period to repetition period such that a strong correlation can be shown between data points belonging to a same season over multiple repetition periods. It is further noted that time span for a season is too long if there is insufficient differences between the season and adjacent seasons—i.e., the seasons lack the distinguishing characteristics of individual "seasons."

Examples of seasonality include: Hourly, Daily, and Monthly seasonality. In each instance the period of time represents the duration of a "season" within a repeating pattern period. Thus, in the case of Hourly seasonality, the hourly seasonal pattern typically repeats every day (24 hours). In the case of Daily seasonality, the daily seasonal pattern may repeat every week (7 days), month (approximately every 30 days), or year (every 365 days). In the case of Monthly seasonality, the monthly seasonal pattern typically repeats every year (12 months). The designated seasonality specifies the granularity of the data points within the specified cycle. Thus, every observable pattern repetition period (e.g., a day, a week, a month, a year) comprises a set of identified seasonal data points. Importantly, seasonality does not mean corresponding seasonal values for two compared repetition periods are repeated. Rather the "shape" of the data on a value-versus-time plot approximately follows a pattern that is repeated each "s" data points (e.g., every 24 data points for hourly seasonality where a data point is provided for each hour of a daily repeating pattern).

Figure 5:
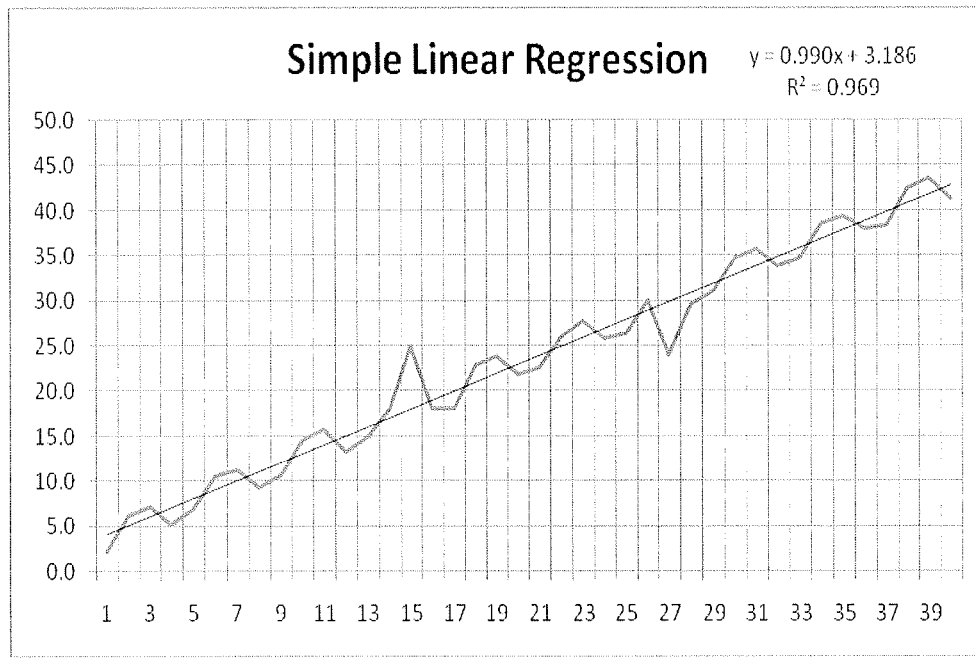
FIG. 5 is an exemplary chart graphically depicting a series of points and a simple linear regression best fit line.

Having described "seasonality" (applied herein below), attention is directed to an exemplary set of steps summarized in FIG. 4. Referring to FIG. 5 (depicting a set of points), during step 400, the data correcting functionality of the application server 123, using Simple Linear Regression, establishes a best fit line (y=ax+b) through an exemplary set of forty (40) raw performance parameter data points—including two (2) anomalous data points (i.e., points 15 and 27). Simple Linear Regression fits a straight line through a set of plotted data points such that the sum of squared "residuals" (difference between an actual data point and a corresponding fitted point on the best fit line) is minimized. During step 400, the data correcting functionality stores the slope "a" of the Simple Linear Regression line based upon the raw data points.

The residuals generally do not present the (gradual upward) trending nature of the set of raw data points (the residuals are generally balanced around zero). Hence, plotting the residuals is one method for de-trending the set of raw time series performance parameter data points.

In the illustrative data point example provided in FIG. 5, the acquired data has a seasonality such that four (4) data points (seasons) are present for each repetition cycle of a repeating pattern of exemplary performance parameter values. The line (y=0.990x+3.186) in FIG. 5 represents a set of forty (40) discrete points {Ln} along the fitted line.

Figure 6:
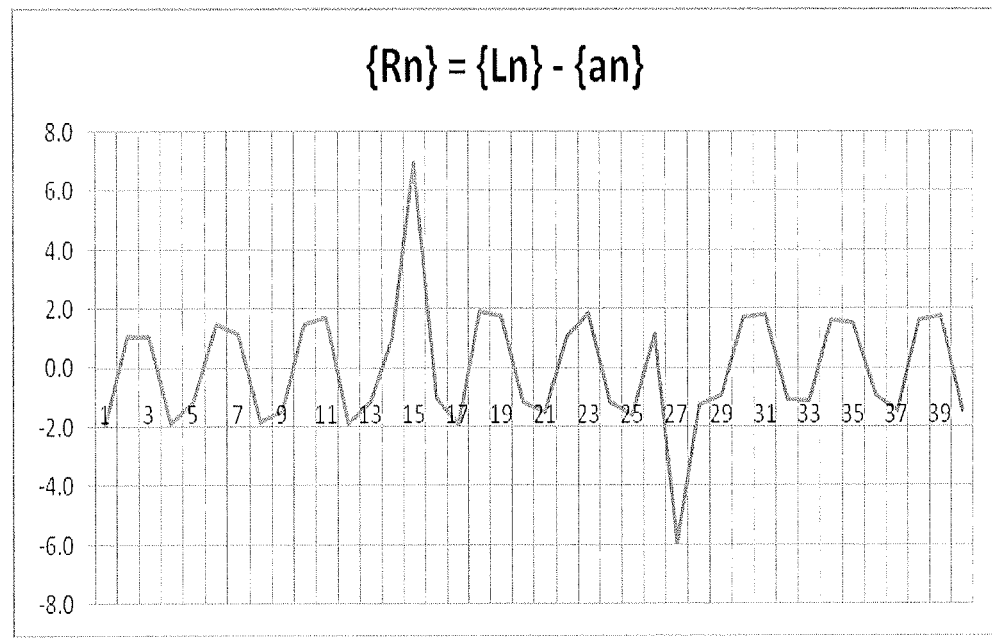
FIG. 6 is an exemplary chart graphically depicting a series of residual points based upon the data points and simple regression best fit line of FIG. 5.

Thereafter, during step 410 the data correcting functionality of the application server 123 calculates a set of forty (40) residuals (i.e., $\{R_n\}=\{L_n\}-\{a_n\}$) by applying a current best fit line, as previously determined by simple linear regression, to a current data point set. In a first iteration of step 410, the raw performance data points are used as the current data point set. In later iterations of step 410, the current data point set is replaced by an updated data point set established during step 450. The set of 40 residuals, associated with a first iteration of step 410, are illustratively depicted in FIG. 6. Points 15 and 17 appear to not track with other typical values for the raw data set—as evidenced by their substantially greater residual magnitudes in comparison to other points in the raw data set.

During step 420, the data correcting functionality decomposes the set of forty residuals into seasonal subsets of data by joining the $i^{th}$ (e.g., $4^{th}$) element of each cycle, i={1, . . ., s} into a different bucket of data point residuals. This will effectively create "s" (e.g., 4) seasonal subsets of data $\{S_1\}$, $\{S_2\}$, $\{S_3\}$, . . . , $\{S_s\}$. Thus, in the illustrative example, the forty data point residuals are decomposed into four (4) seasonal subsets during step 420. Each subset will have as many elements as seasonal cycle periods contained in the original dataset. For example: 30 days of hourly seasonality data (i.e., repeating pattern every 24 hour-long seasons) will generate 24 subsets with 30 data point residual values each. In the illustrative example, 10 cycles having 4 seasons per cycle results in four (4) subsets of data points, each containing ten (10) data points.

During step 430 (see also FIG. 7), the data correcting functionality performs a boxplot analysis on each of the seasonal subsets of data point residuals created during step 420 to identify anomalous/unusual data point residuals and replace the identified data point residuals by a median of the remaining (non-unusual) data point residual values for the particular seasonal subset to which each identified anomalous/unusual residual data point belongs. Boxplot analysis is incorporated into the operation of the data correcting functionality to identify unusual (anomalous) data point residuals within the seasonal groups created during step 420. Boxplot analysis includes building a "block" representing a degree of dispersion that a particular data set (seasonal subset) has around a median data point residual value for the (seasonal subset) data set. Each data point residual value is represented by a line within the box. Each of the seasonal subsets is associated with an acceptable high and low deviation from a median residual value for the seasonal subset. A mathematical/analytical expression defining an acceptable deviation from the median for a seasonal subset may differ for various examples. However, in an illustrative example, a statistical measure—e.g., standard deviation, interquartile value, etc.—is used to determine statistically anomalous data point residual values. Thus, in a particular example the magnitude of an acceptable deviation from a median value is taken as being 1.5 times the interquartile (middle 50%) range value. In yet another example, a multiple of a standard deviation is used to identify statistically anomalous data point residual values. Any data point residual value that exceeds the extreme "whiskers" of a box for a particular seasonal subset is considered to correspond to an unusual/anomalous data point. Thus, during step 430, in the illustrative example depicted in FIG. 7, points 15 (too high) and 27 (too low), of group 3 are identified as anomalous data point residuals in need of correction.

Figure 7:
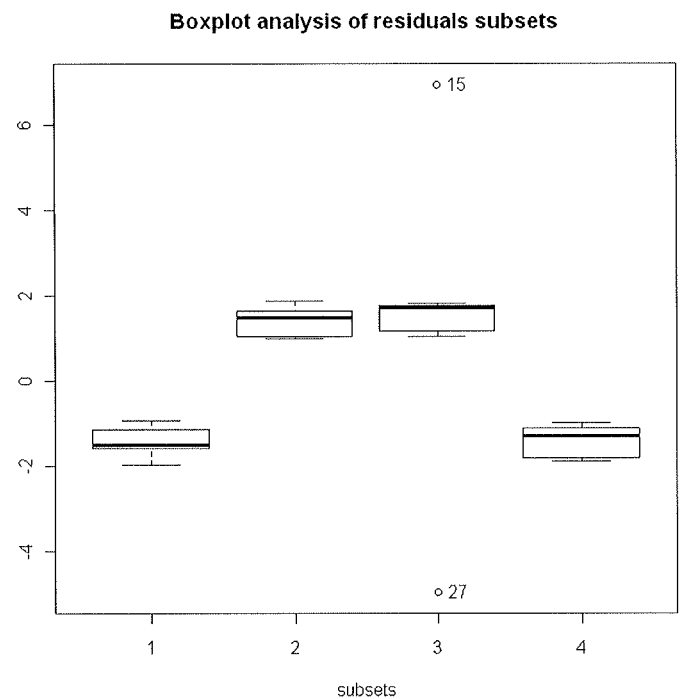
FIG. 7 is an exemplary chart graphically depicting a simple boxplot analysis graph comprising four seasonal subsets of residual point values.

Continuing with the description of step 430, the data correcting functionality also corrects the anomalous data point residual values (e.g., points 15 and 27 of seasonal group 3 in FIG. 7). Correction, by way of example, involves replacing the residual values for points 15 and 27 by the median residual value for seasonal group 3.

Figure 8:
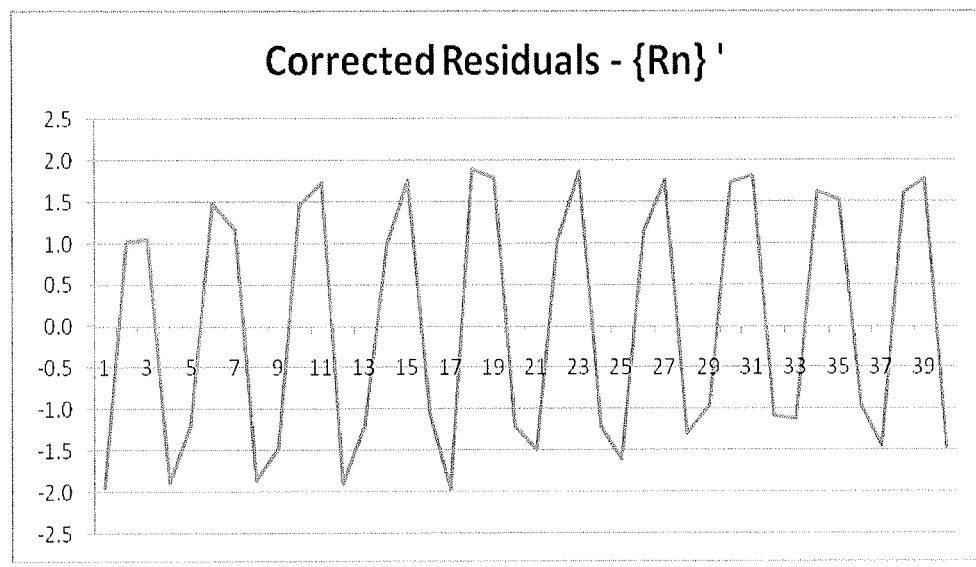
FIG. 8 is an exemplary chart graphically depicting a series of points after correcting residual values falling outside value ranges specified by boxes in the boxplot graph of FIG. 7.

During step 440, the data correcting functionality reconstructs the time-sequenced set of data point residuals using the corrected data point residual subsets created during step 430. Referring to FIG. 8, step 440 results in creating the corrected residuals $\{R_n\}'$ containing new values for points 15 and 27.

Figure 9:
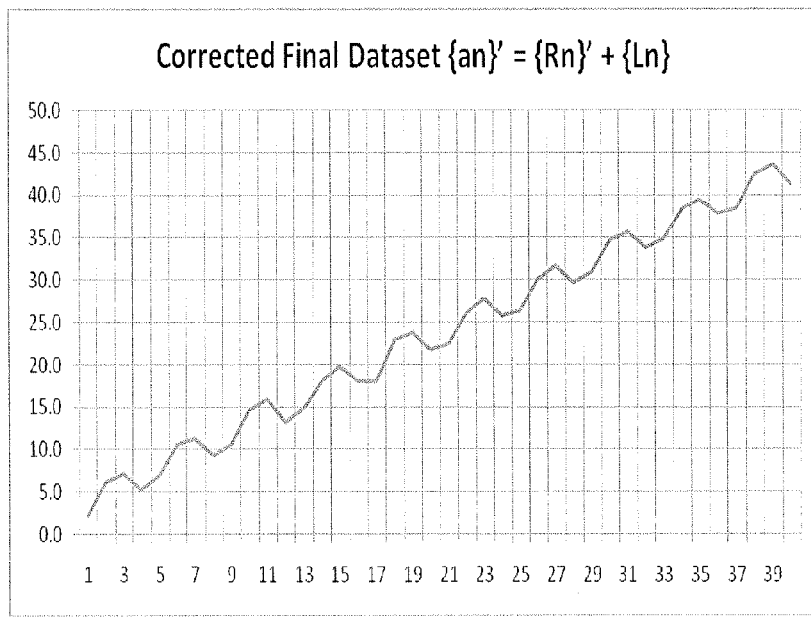
FIG. 9 is an exemplary chart graphically depicting a series of corrected data points rendered by adding the corrected residual values to the current best fit line.

During step 450 (see FIG. 9), the data correcting functionality creates a reconstructed data set for the performance parameter from the current best fit line and the corrected data point residuals according to, for example, the formula $\{a_n\}'=\{R_n\}'+\{L_n\}$.

During step 460, the data correcting functionality calculates a new regression line (y'=a'x+b') for the reconstructed data set $\{an\}'$. Thereafter, at step 470, if the difference between the new slope (a') and the old slope (a) is less than a particular K value, then the correction operation (step 220 of FIG. 3) stops and returns the calculated $\{a_n\}'$. On the other hand, if the difference between the new and old slope exceeds the particular K value, then the correcting function passes from step 470 to step 410. The subsequent reiteration of steps 410, 420, 430, 440, 450 and 460 uses the new Best Fit Line calculated during step 460 to potentially identify and correct additional anomalous data point residuals. Alternatively, the comparing step 470 comprises comparing a ratio (magnitude) for the new best fit line and the current best fit line and a threshold ratio value. Thus, the difference investigated during step 470 can be measured multiple different ways (e.g., ratio, difference, etc.).

Given the importance of the cleansing function performed during step 210 (and described in detail in FIG. 4), a further example is described herein below with reference to FIGS. 10-22. In the further example, the KPI parameter of interest is "throughput rate" data (as defined by the ratio of bits transferred over a particular period of time divided by the elapsed time) from an interface of the PDSN 114. In the example, FIG. 11 graphically depicts a series of data points that clearly misses data points as well as extremely large peak values. Such data set, if not corrected, will result in inaccurate results as the outliers and missing data will corrupt the parameter estimates used by the model.

Figure 10:
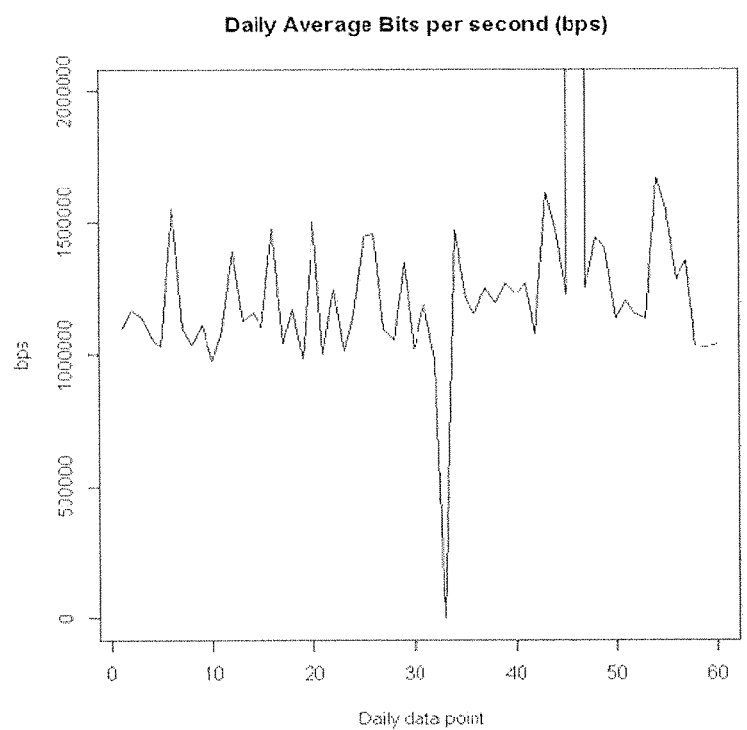
FIG. 10 is an exemplary chart graphically depicting a series of 60 points having a granularity of one day.

The process of identifying and correcting anomalous data points in a time series stream of data points exhibiting seasonality begins by initially determining the "seasonality" of the raw input data stream. In the further illustrative example, FIG. 10 depicts data having a granularity of one point per day over 60 days. In FIG. 10, the data does not appear to provide a series of multi-point sequences having a repeating pattern. In contrast, FIG. 11, containing points with a granularity of 1 hour, appears to exhibit a repeating pattern (over 24 hours). Thus, during the data point cleansing operation (step 210), the data from FIG. 11 is used rather than the data depicted in FIG. 10.

Figure 11:
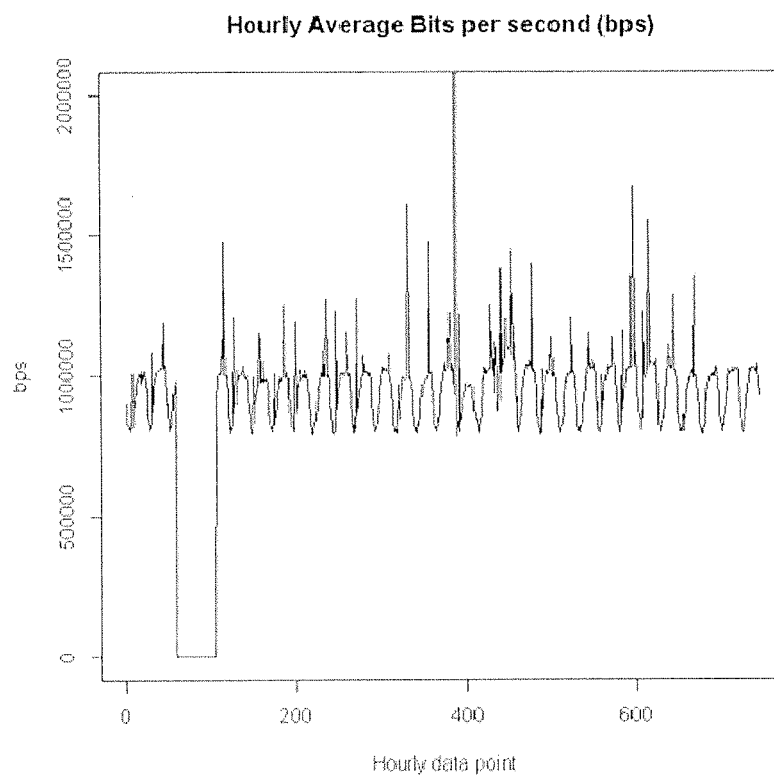
FIG. 11 is an exemplary chart graphically depicting a series of points having a granularity of one hour.
Figure 12:
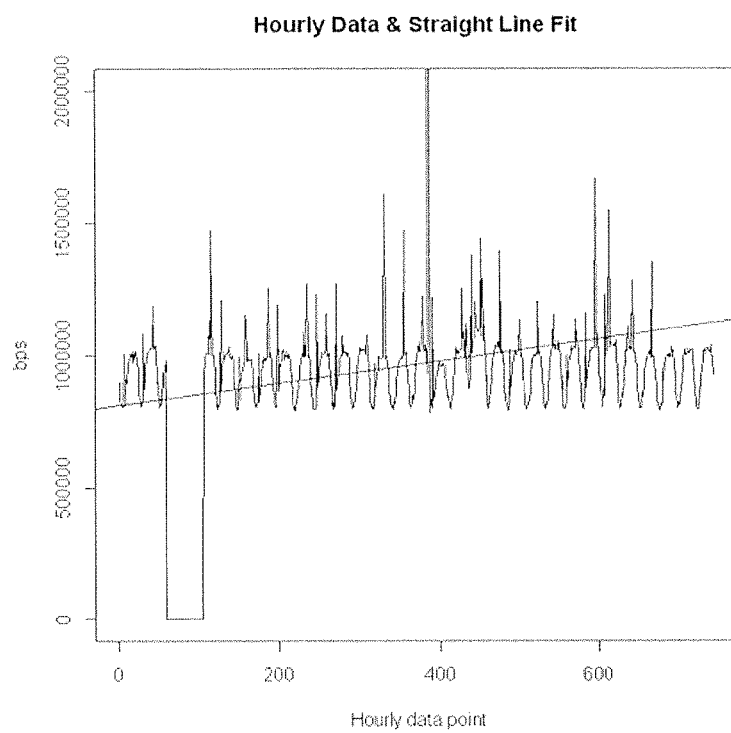
FIG. 12 is an exemplary chart graphically depicting a series of data points and a best fit line.
Figure 13:
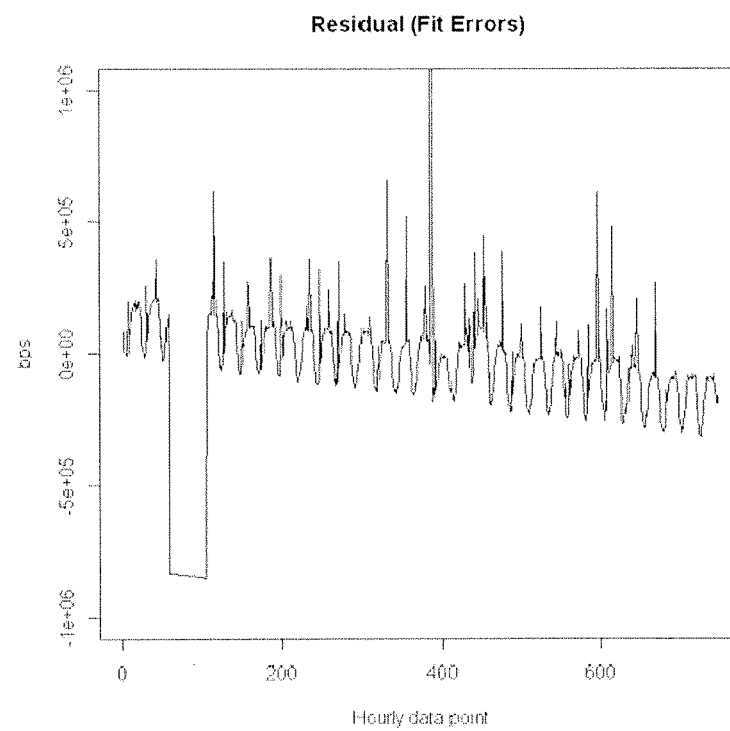
FIG. 13 is an exemplary chart graphically depicting a series of residual points based upon the data points and simple regression best fit line of FIG. 12.

Turning to FIG. 12, an initial best fit line is established based upon the raw data of FIG. 11. See step 400. Next, a set of corresponding residual errors are calculated as shown in FIG. 13. See step 410. It is noted that an upward sloping (trending) initial best fit line is rendered in the analysis summarized in FIG. 12. The initial slope determination is compared in subsequent stages (step 470) to verify convergence of the algorithm, and the iterative data point correction routine can be terminated).

Figure 14:
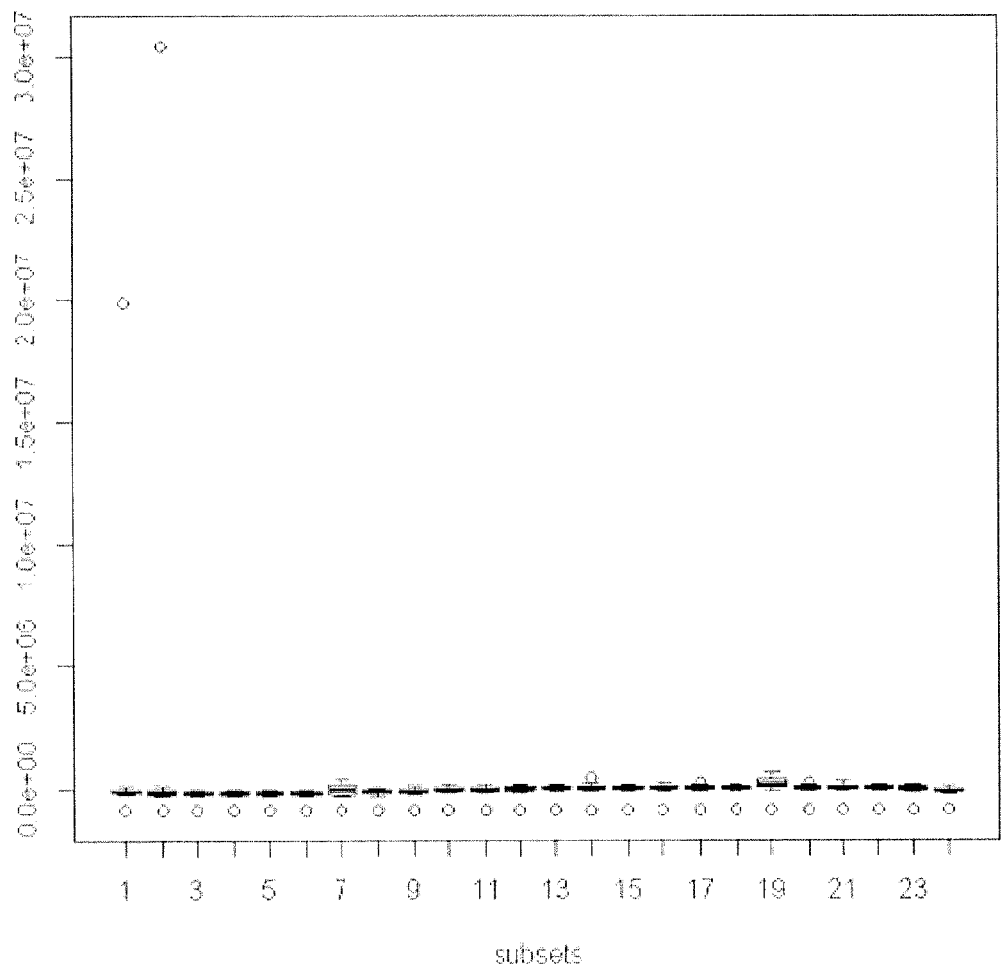
FIG. 14 is an exemplary chart graphically depicting a boxplot analysis graph comprising twenty-four seasonal subsets of residual point values.
Figure 15:
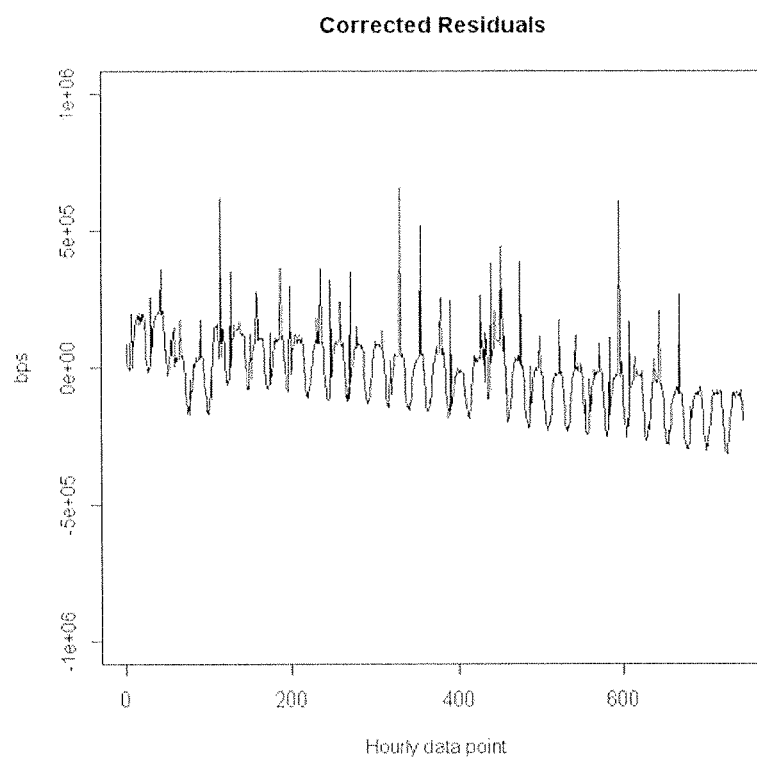
FIG. 15 is an exemplary chart graphically depicting a series of corrected residuals after correcting for residual point values falling outside the boxes of the boxplot graph depicted in FIG. 14.
Figure 16:
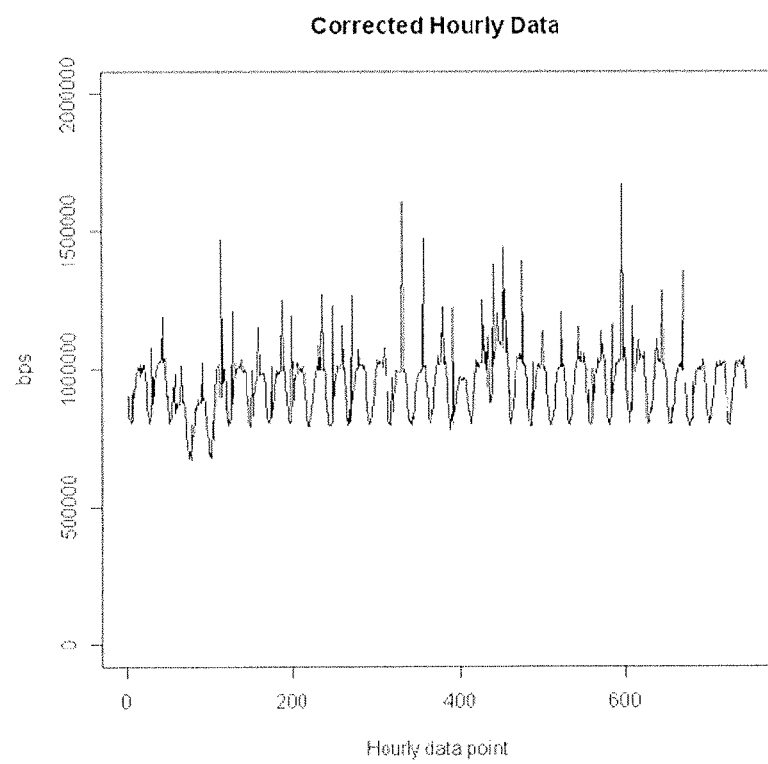
FIG. 16 is an exemplary chart graphically depicting a series of corrected hourly data points generated by adding the corrected residual points to the current best fit line.

Next, with reference to FIG. 14, boxplot analysis is performed on the residual data points depicted in FIG. 13. See steps 420 and 430. Since the data is hourly data and the seasonality (i.e., the period for repeating the hourly data) is daily, the boxplot analysis comprises breaking the sequence of residual data points into 24 subsets corresponding to the 24 hours of the day. Thereafter, anomalous data points are identified based upon their positions relative to the "box" established by the set of points within their subset. The circles shown in FIG. 14 represent the anomalous residual data values detected within a particular subset (hour of the day) of the set of 24 subsets. The anomalies detected during the boxplot analysis are replaced by their corresponding subset's median value to generate a new set of residuals as shown in FIG. 15. See Step 440. The first attempt to replace the missing/anomalous data points is performed. See FIG. 16. Once the new corrected residuals has been calculated, the corrected data point set is constructed using the previous fitted line as shown in FIG. 7. See step 450. Notice the improvement of the new corrected data set shown in FIG. 16 in comparison to the original data point set depicted in FIG. 11.

Figure 17:
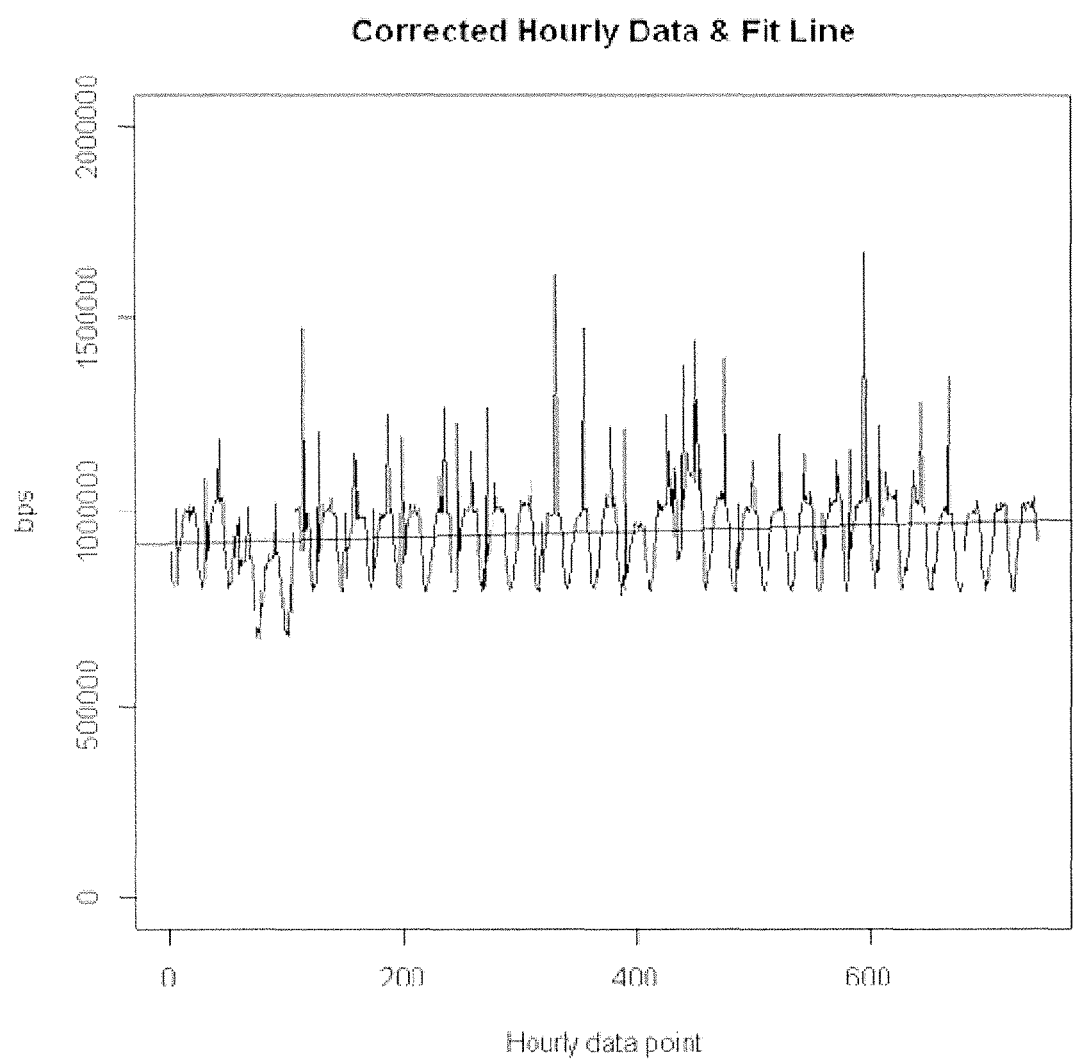
FIG. 17 is an exemplary chart graphically depicting a series of corrected hourly data points and the current best fit line based upon the series of corrected hourly data points.

However, further iterations of the data set cleansing operation described herein above, if necessary, will improve the initial set of corrected values. The decision to perform subsequent iterations is based upon a comparison of the slopes of a new best fit line (based upon the new corrections) and a previous best fit line. Turning to FIG. 17, a new straight line is fit to the new corrected data set, and the slope is compared with the slope of the previous fit line. See step 470. If the difference in slopes is greater than a pre-defined threshold the sequence of data cleansing steps is reiterated, starting with calculating new residuals based upon the new best fit line arising from the data point corrections of the previous iteration of the data point cleansing sequence. In the illustrative example, the slope of the best fit line has changed substantially in comparison to the previous best fit line. See FIG. 12. Thus, a further iteration of the cleansing steps is performed in this particular illustrative example.

Figure 18:
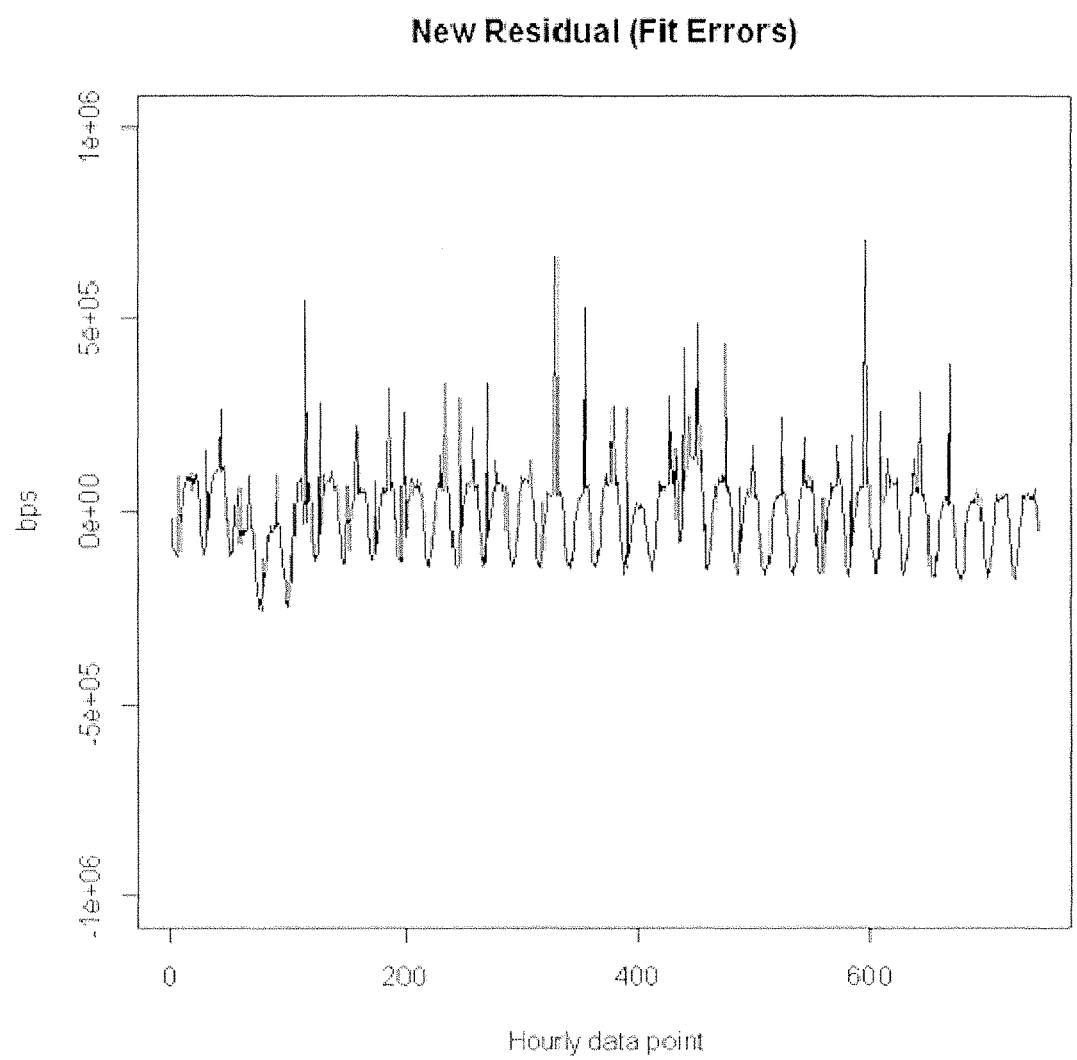
FIG. 18 is an exemplary chart graphically depicting a new series of residual points based upon the data points and simple regression best fit line of FIG. 17.
Figure 19:
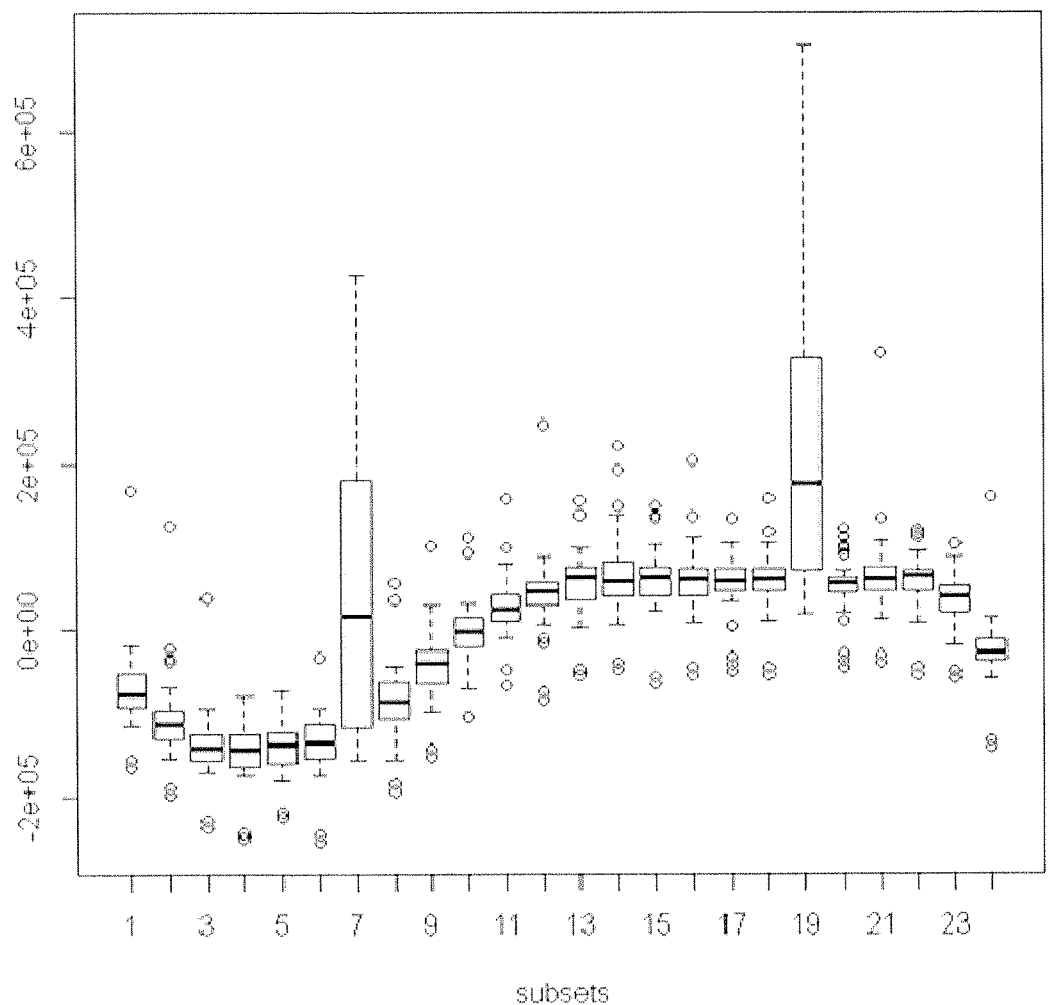
FIG. 19 is an exemplary chart graphically depicting a new boxplot analysis graph comprising twenty-four seasonal subsets of residual point values.
Figure 20:
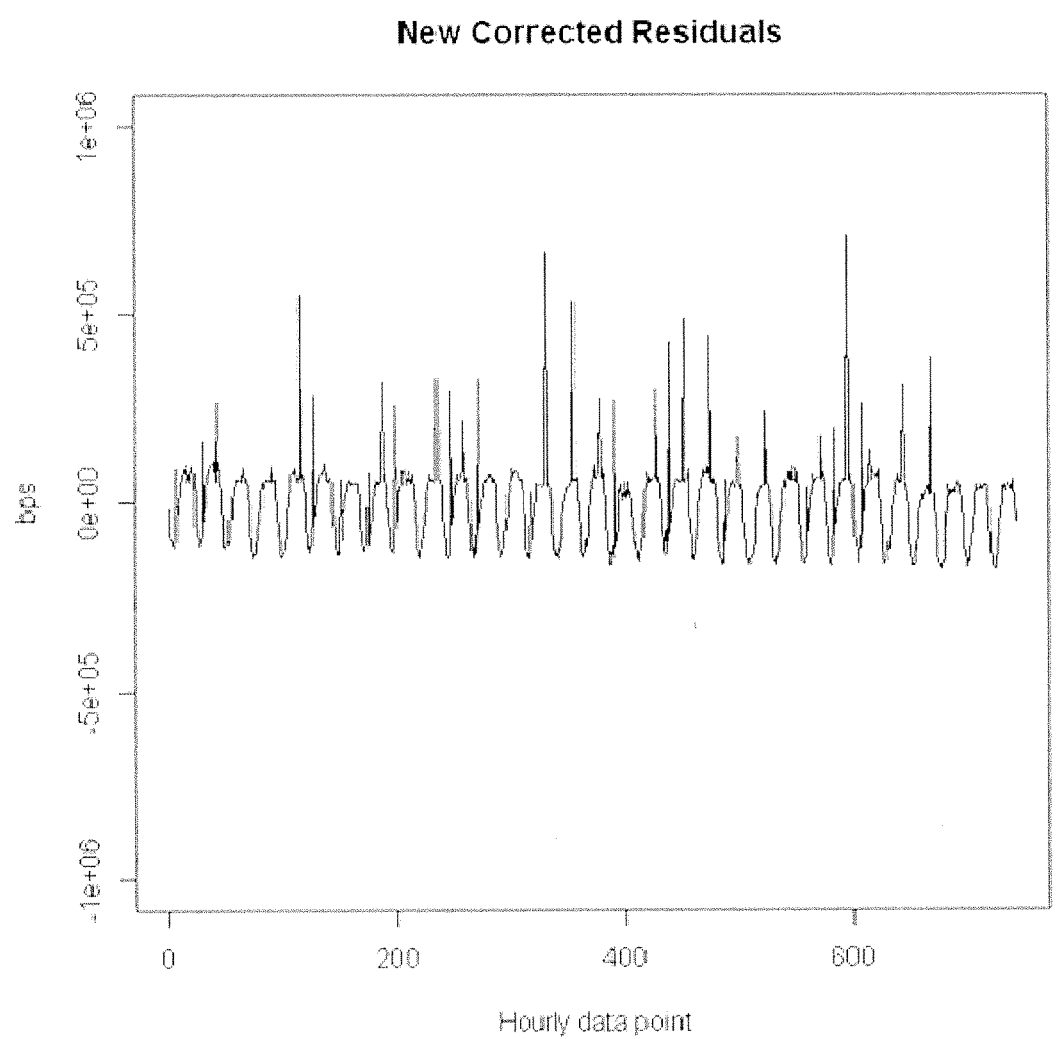
FIG. 20 is an exemplary chart graphically depicting a new series of corrected residuals after correcting for residual point values falling outside the boxes of the boxplot graph depicted in FIG. 19.

With reference to FIG. 18, a new set of residuals are calculated. See FIG. 410. Next, a boxplot analysis is performed on the new residual data set. The results are shown in FIG. 19 with the new anomalies represented as circles. FIG. 19 is also notable for its illustration of the relatively large boxes at hours 7 and 19—indicating considerably high variability during the corresponding hours of the day. This also indicates that most of the spikes observed in the data are occurring during those times which suggest that those spikes are not really anomalies but instead they correspond to peak hours in the network where we expect high usage. A detailed view of the data would confirm that most of the spikes happen during those hours.

Anomalous data point residuals are replaced by the median value of the subset to which they belong, and a new set of corrected residuals is generated. See FIG. 20.

Figure 21:
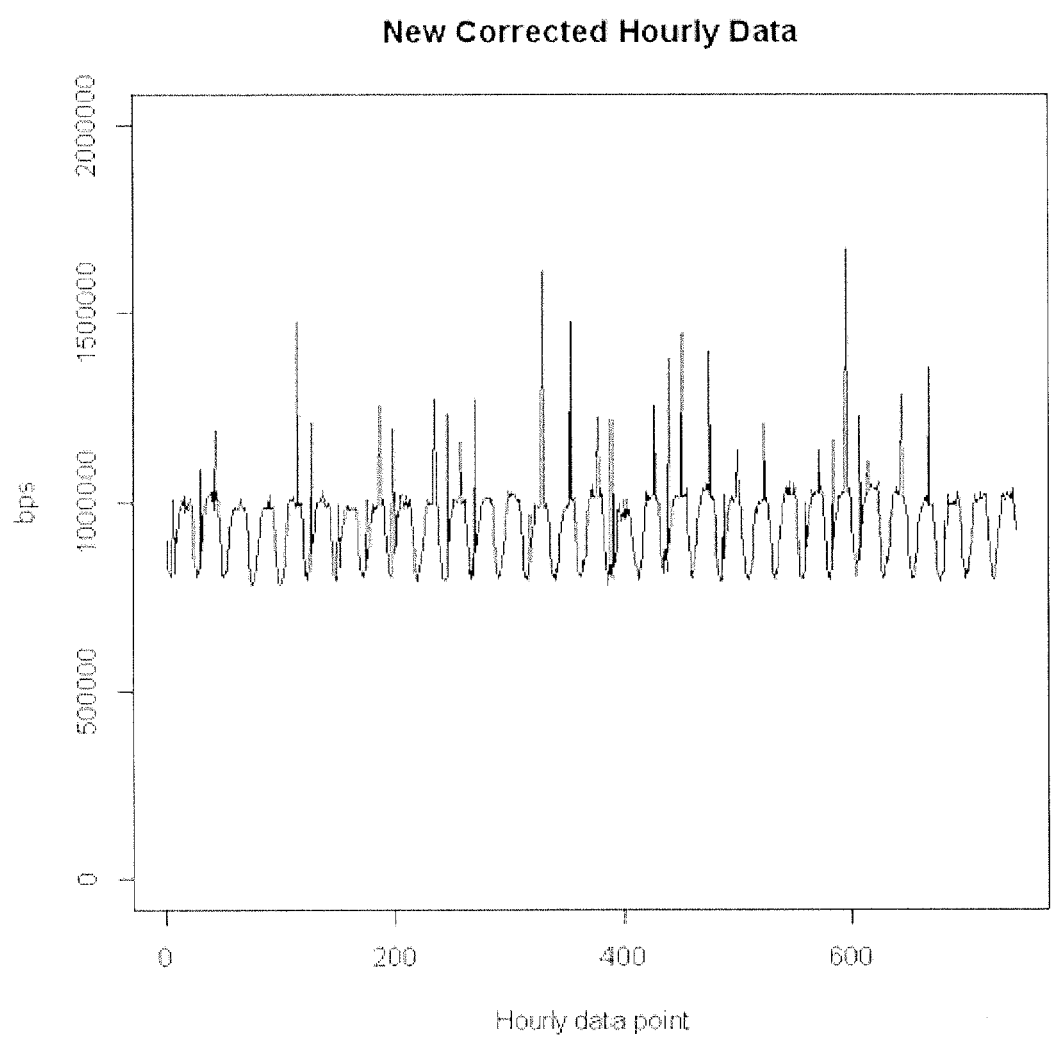
FIG. 21 is an exemplary chart graphically depicting a new series of corrected hourly data points generated by adding the corrected residual points to the new current best fit line.
Figure 22:
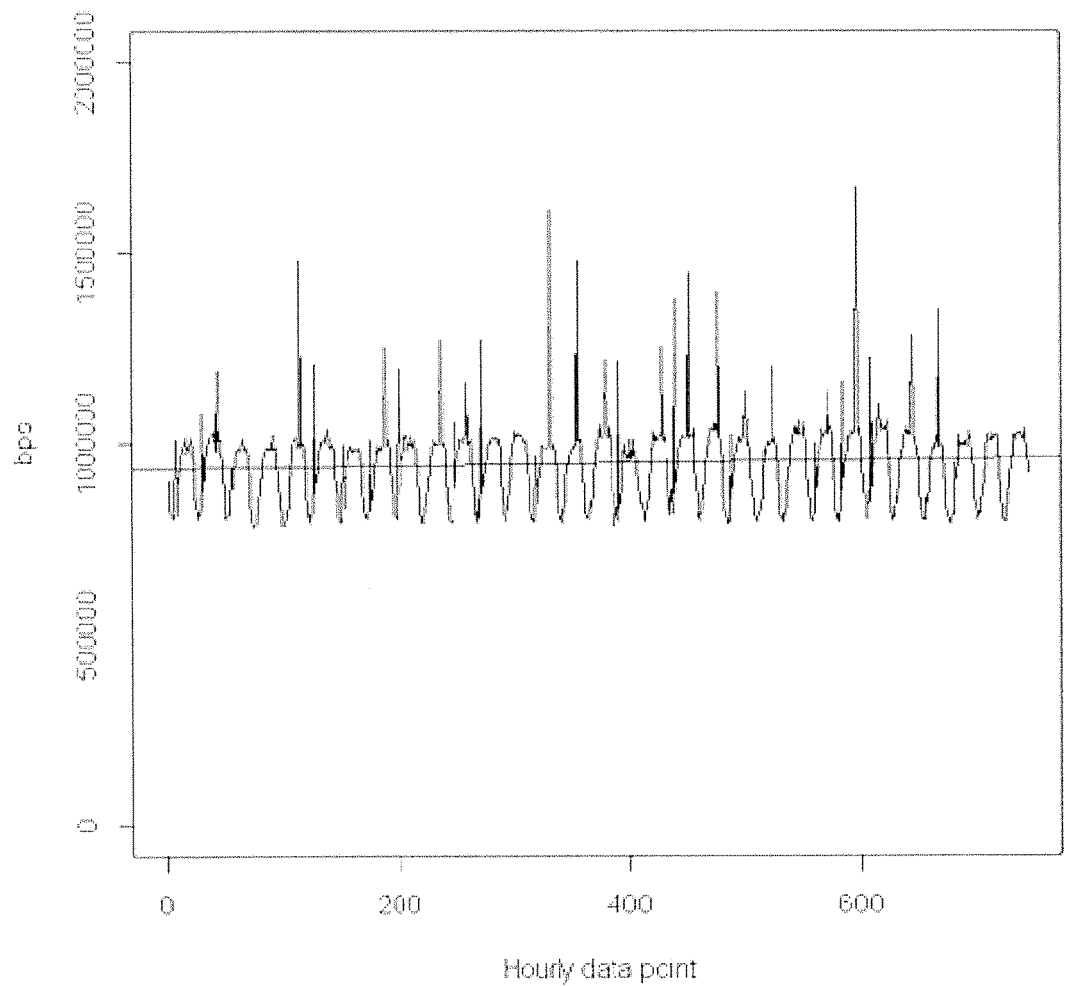
FIG. 22 is an exemplary chart graphically depicting a new series of corrected hourly data points and the new current best fit line based upon the new series of corrected hourly data points.

Referring to FIG. 21, a new corrected data point series is created, and a new best fit line is determined as shown in FIG. 22. The new best fit line has a slope that is sufficiently close to the one previously determined (see FIG. 17) during the previous iteration of the cleansing steps. Thus, the comparison step 470 identifies a satisfactory stopping condition, and the end of step 220 is reached wherein a new corrected data set is provided to the performance variable forecast model. Note that the spikes occurring at hours 7 & 19 are still present in the data as they represent peak hour behavior and not really anomalous (i.e., inaccurate) data points. It is also important to observe that without applying the seasonality approach described herein, all the spikes could be mistakenly identified as anomalies without realizing that most of them were happening during a particular set of hours.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein known to the inventors for carrying out the invention. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for rendering, by a computerized mobile wireless data network performance parameter forecasting system, a forecast for a mobile wireless network performance parameter, the method comprising the steps of:
    acquiring, via a communications network infrastructure for the mobile wireless network, a raw data point set containing a series of data point values for the mobile wireless network parameter;
    correcting, by the computerized mobile wireless data network performance parameter forecasting system, the raw data point set, the correcting comprising a set of sub-steps, executed by the computerized forecasting system, of:
        performing a first linear regression on the raw data point set to render an initial best fit line,
        calculating a current series of data point residuals based upon:
            a current best fit line, the current best fit line being in a first instance the initial best fit line, and
            a current series of data point values, the current series of data point values being in a first instance the raw data point set,
        decomposing the current series of data point residuals into a current set of seasonal data point residual subsets,
        performing a boxplot analysis on the current set of seasonal data point residual subsets to identify individual anomalous point residuals to render a current set of anomalous data point residuals,
        correcting the current set of anomalous data point residuals to render a corrected data point residual set, and
        applying the corrected data point residual set to the current best fit line to render a current corrected data point set; and
    applying the current corrected data point set to a forecast model to render a forecast for the mobile wireless network performance parameter.

2. The method of claim 1 wherein the correcting the raw data point set further comprises:
    performing, after the applying step, a further linear regression on the current corrected data point set to render a new best fit line;
    comparing the new best fit line to the current best fit line; and
    conditionally repeating, based upon the comparing step, the calculating, decomposing, performing the boxplot analysis, correcting the current set of anomalous data point residuals, and applying the corrected data point residual set sub-steps using:
        the current corrected data point set as the current series of data point values, and
        the new best fit line as the current best fit line.

3. The method of claim 2 wherein the comparing step comprises comparing a slope for the new best fit line and a slope for the current best fit line.

4. The method of claim 3 wherein the comparing the slope for the new best fit line and the slope for the current best fit line comprises comparing:
    a difference in magnitude between the slope value for the new best fit line and the slope value for the current best fit line, and
    a threshold difference in magnitude value.

5. The method of claim 3 wherein the comparing the slope for the new best fit line and the slope for the current best fit line comprises comparing:
    a ratio magnitude for the slope for the new best fit line and the slope for the current best fit line, and
    a threshold ratio magnitude.

6. The method of claim 1 wherein a seasonality of the current set of seasonal data point residual subsets is daily.

7. The method of claim 6 wherein a granularity of the raw data point set is one data point per hour.

8. The method claim 1 wherein the mobile wireless network performance parameter is a measure of throughput on a mobile wireless data network component.

9. The method of claim 8 wherein the mobile wireless data network component is a packet data serving node (PDSN).

10. The method of claim 1 wherein the forecast model renders a forecast value based upon input data point vectors comprising a time-series sequential set of data points.

11. A non-transitory computer-readable medium including computer-executable instructions that, when executed by a computerized mobile wireless data network performance parameter forecasting system, facilitate rendering a forecast for a mobile wireless network performance parameter by performing a method comprising the steps of:
   acquiring, via a communications network infrastructure for the mobile wireless network, a raw data point set containing a series of data point values for the mobile wireless network parameter;
   correcting the raw data point set, the correcting comprising the sub-steps of:
      performing a first linear regression on the raw data point set to render an initial best fit line,
      calculating a current series of data point residuals based upon:
         a current best fit line, the current best fit line being in a first instance the initial best fit line, and
         a current series of data point values, the current series of data point values being in a first instance the raw data point set,
      decomposing the current series of data point residuals into a current set of seasonal data point residual subsets,
      performing a boxplot analysis on the current set of seasonal data point residual subsets to identify individual anomalous point residuals to render a current set of anomalous data point residuals,
      correcting the current set of anomalous data point residuals to render a corrected data point residual set, and
      applying the corrected data point residual set to the current best fit line to render a current corrected data point set; and
   applying the current corrected data point set to a forecast model to render a forecast for the mobile wireless network performance parameter.

12. The non-transitory computer-readable medium of claim 11 wherein the correcting the raw data point set further comprises:
   performing, after the applying step, a further linear regression on the current corrected data point set to render a new best fit line;
   comparing the new best fit line to the current best fit line; and
   conditionally repeating, based upon the comparing step, the calculating, decomposing, performing the boxplot analysis, correcting the current set of anomalous data point residuals, and applying the corrected data point residual set sub-steps using:
      the current corrected data point set as the current series of data point values, and
      the new best fit line as the current best fit line.

13. The non-transitory computer-readable medium of claim 12 wherein the comparing step comprises comparing a slope for the new best fit line and a slope for the current best fit line.

14. The non-transitory computer-readable medium of claim 13 wherein the comparing the slope for the new best fit line and the slope for the current best fit line comprises comparing:
   a difference in magnitude between the slope value for the new best fit line and the slope value for the current best fit line, and
   a threshold difference in magnitude value.

15. The non-transitory computer-readable medium of claim 13 wherein the comparing the slope for the new best fit line and the slope for the current best fit line comprises comparing:
   a ratio magnitude for the slope for the new best fit line and the slope for the current best fit line, and
   a threshold ratio magnitude.

16. The non-transitory computer-readable medium of claim 11 wherein a seasonality of the current set of seasonal data point residual subsets is daily.

17. The non-transitory computer-readable medium of claim 16 wherein a granularity of the raw data point set is one data point per hour.

18. The non-transitory computer-readable medium claim 11 wherein the mobile wireless network performance parameter is a measure of throughput on a mobile wireless data network component.

19. The non-transitory computer-readable medium of claim 18 wherein the mobile wireless data network component is a packet data serving node (PDSN).

20. The non-transitory computer-readable medium of claim 11 wherein the forecast model renders a forecast value based upon input data point vectors comprising a time-series sequential set of data points.

* * * * *